(12) United States Patent
Cha et al.

(10) Patent No.: US 12,107,791 B2
(45) Date of Patent: Oct. 1, 2024

(54) METHOD FOR RECEIVING REFERENCE SIGNAL FOR POSITIONING BY CONFIGURING ZERO POWER IN WIRELESS COMMUNICATION SYSTEM AND APPARATUS FOR SUPPORTING SAME

(71) Applicant: LG ELECTRONICS INC., Seoul (KR)

(72) Inventors: Hyunsu Cha, Seoul (KR); Hyunsoo Ko, Seoul (KR); Sukhyon Yoon, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 320 days.

(21) Appl. No.: 17/628,183

(22) PCT Filed: Jul. 20, 2020

(86) PCT No.: PCT/KR2020/009509
§ 371 (c)(1),
(2) Date: Jan. 18, 2022

(87) PCT Pub. No.: WO2021/015510
PCT Pub. Date: Jan. 28, 2021

(65) Prior Publication Data
US 2022/0271888 A1    Aug. 25, 2022

(30) Foreign Application Priority Data
Jul. 19, 2019    (KR) .......................... 10-2019-0087633

(51) Int. Cl.
*H04L 5/00*    (2006.01)

(52) U.S. Cl.
CPC .................. *H04L 5/0051* (2013.01)

(58) Field of Classification Search
CPC ...... H04L 5/005; H04L 5/0048; H04L 5/0051
See application file for complete search history.

(56) References Cited

U.S. PATENT DOCUMENTS

| 2013/0336224 | A1  | 12/2013 | Davydov et al. |
| 2017/0097404 | A1  | 4/2017  | Siomina et al. |
| 2017/0276761 | A1* | 9/2017  | Park .................... G01S 5/0242 |

FOREIGN PATENT DOCUMENTS

| KR | 10-2012-0082717 A | 7/2012 |
| KR | 10-2017-0053338 A | 5/2017 |
| WO | 2016/036154 A1    | 3/2016 |

OTHER PUBLICATIONS

International Search Report from PCT/KR2020/009509; dated Nov. 11, 2020.
Written Opinion of the ISA from PCT/KR2020/009509; dated Nov. 11, 2020.

\* cited by examiner

*Primary Examiner* — Lan N Moore
*Assistant Examiner* — Brian T Le
(74) *Attorney, Agent, or Firm* — BRYAN CAVE LEIGHTON PAISNER LLP

(57) ABSTRACT

Various embodiments of the present disclosure relate to a next-generation wireless communication system for supporting a higher data transfer rate and the like beyond the 4th generation (4G) wireless communication system. According to various embodiments of the present disclosure, a method for transmitting/receiving a signal in a wireless communication system and an apparatus for supporting same can be provided.

15 Claims, 33 Drawing Sheets

(a)

(b)

(a)

(b)

(c)

(a)

(b)

METHOD FOR RECEIVING REFERENCE SIGNAL FOR POSITIONING BY CONFIGURING ZERO POWER IN WIRELESS COMMUNICATION SYSTEM AND APPARATUS FOR SUPPORTING SAME

CROSS-REFERENCE TO RELATED APPLICATIONS

This application is the National Stage filing under 35 U.S.C. 371 of International Application No. PCT/KR2020/009509, filed on Jul. 20, 2020, which claims the benefit of KR Patent Application No. 10-2019-0087633 filed on Jul. 19, 2019, the contents of which are all hereby incorporated by reference herein in their entirety.

TECHNICAL FIELD

Various embodiments of the present disclosure relate to a wireless communication system.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

As described above, the introduction of the next generation RAT considering the enhanced mobile broadband communication, massive MTC, ultra-reliable and low latency communication (URLLC), and the like has been discussed.

DISCLOSURE

Technical Problem

Various embodiments of the present disclosure may provide a method of transmitting and receiving a signal and an apparatus supporting the same in a wireless communication system.

For example, various embodiments of the present disclosure may provide a positioning method and an apparatus supporting the same in a wireless communication system.

For example, various embodiments of the present disclosure may provide a method of increasing the positioning accuracy of a user equipment (UE) by enabling the UE to directly request a positioning reference signal (PRS) muting/zero-power configuration, and an apparatus supporting the same.

For example, various embodiments of the present disclosure may provide a method of, when different PRS resources partially overlap with each other, allowing a PRS muting/zero-power configuration only for the partial overlapped area and thus positioning a UE by using all of the different PRS resources, and an apparatus supporting the same.

For example, various embodiments of the present disclosure may provide a method of configuring/indicating PRS muting such that a UE may effectively receive a PRS used for UE positioning from a neighboring cell as well as a serving cell, and an apparatus supporting the same.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

Various embodiments of the present disclosure may provide a method of transmitting and receiving a signal and an apparatus supporting the same in a wireless communication system.

According to various embodiments of the present disclosure, a method performed by a user equipment (UE) in a wireless communication system may be provided.

In an exemplary embodiment, the method may include receiving information related to a positioning reference signal (PRS) resource, receiving at least one PRS based on the PRS resource, transmitting information requesting a zero-power configuration for at least a part of the at least one PRS based on the PRS resource, and receiving the at least one PRS at least partially configured with zero power in response to the information requesting the zero-power configuration.

In an exemplary embodiment, each of the at least one PRS based on the PRS resource may be received from each of at least one transmission point (TP).

In an exemplary embodiment, the information requesting the zero-power configuration may include information requesting a zero-power configuration for a PRS received from at least a part of the at least one TP.

In an exemplary embodiment, a signal strength of the PRS received from the at least part of the at least one TP may be greater than signal strengths of PRSs received from the at least one TP except for the at least part of the at least one TP.

In an exemplary embodiment, each of the at least one PRS based on the PRS resource may be received based on (i) at least one PRS resource and (ii) at least one PRS resource set including the at least one PRS resource.

In an exemplary embodiment, the information requesting the zero-power configuration may include at least one of (i) information request a zero-power configuration for at least a part of the at least one PRS resource or (ii) information requesting a zero-power configuration for at least a part of the at least one PRS resource set.

In an exemplary embodiment, each of the at least one PRS resource may be identified based on at least one of a PRS resource identifier (ID) or a PRS scrambling ID.

In an exemplary embodiment, the method may further include further comprising receiving information indicating that the at least part of the at least one PRS at least partially configured with zero power is configured with zero power.

In an exemplary embodiment, the information related to the PRS resource may be received from a location management function (LMF) or a location server.

In an exemplary embodiment, the information requesting the zero-power configuration may be transmitted to a TP receiving the at least one PRS based on the PRS resource.

In an exemplary embodiment, the information indicating that the at least part of the at least one PRS at least partially configured with zero power is configured with zero power may be received from the TP by radio resource control (RRC) signaling, medium access control-control element (MAC-CE) signaling, or downlink control information (DCI).

In an exemplary embodiment, the information indicating that the at least part of the at least one PRS at least partially configured with zero power is configured with zero power may include information indicating that the at least part of the at least one PRS at least partially configured with zero power is configured with zero power for a first time period.

In an exemplary embodiment, the information related to the PRS resource includes information indicating at least a part of the at least one PRS at least partially configured with zero power may be configured with zero power for a second time period.

In an exemplary embodiment, the first time period may be shorter than the second time period.

In an exemplary embodiment, the at least one PRS based on the PRS resource may be received in a plurality of time periods.

In an exemplary embodiment, each of the plurality of time periods may include resource elements (REs) to which the at least one PRS based on the PTS resource is mapped.

In an exemplary embodiment, a PRS mapped to a part of REs included in at least one of the plurality of time periods may be configured with zero power.

According to various embodiments of the present disclosure, an apparatus operating in a wireless communication system may be provided.

In an exemplary embodiment, the apparatus may include a memory, and at least one processor coupled to the memory.

In an exemplary embodiment, the at least one processor may be configured to receive information related to a PRS resource, receive at least one PRS based on the PRS resource, transmit information requesting a zero-power configuration for at least a part of the at least one PRS based on the PRS resource, and receive the at least one PRS at least partially configured with zero power in response to the information requesting the zero-power configuration.

In an exemplary embodiment, each of the at least one PRS based on the PRS resource may be received from each of at least one TP.

In an exemplary embodiment, the information requesting the zero-power configuration may include information requesting a zero-power configuration for a PRS received from at least a part of the at least one TP.

In an exemplary embodiment, each of the at least one PRS based on the PRS resource may be received based on (i) at least one PRS resource and (ii) at least one PRS resource set including the at least one PRS resource.

In an exemplary embodiment, the information requesting the zero-power configuration may include at least one of (i) information request a zero-power configuration for at least a part of the at least one PRS resource or (ii) information requesting a zero-power configuration for at least a part of the at least one PRS resource set.

In an exemplary embodiment, each of the at least one PRS resource may be identified based on at least one of a PRS resource ID or a PRS scrambling ID.

In an exemplary embodiment, the apparatus may communicate with at least one of a mobile terminal, a network, or an autonomous driving vehicle other than a vehicle including the apparatus.

According to various embodiments of the present disclosure, a method performed by a base station (BS) in a wireless communication system may be provided.

In an exemplary embodiment, the method may include receiving information related to a PRS resource, transmitting at least one PRS based on the PRS resource, receiving information requesting a zero-power configuration for at least a part of the at least one PRS based on the PRS resource, and transmitting the at least one PRS at least partially configured with zero power in response to the information requesting the zero-power configuration.

According to various embodiments of the present disclosure, an apparatus operating in a wireless communication system may be provided.

In an exemplary embodiment, the apparatus may include a memory, and at least one processor coupled to the memory.

In an exemplary embodiment, the at least one processor may be configured to receive information related to a PRS resource, transmit at least one PRS based on the PRS resource, receive information requesting a zero-power configuration for at least a part of the at least one PRS based on the PRS resource, and transmit the at least one PRS at least partially configured with zero power in response to the information requesting the zero-power configuration.

According to various embodiments of the present disclosure, an apparatus operating in a wireless communication system may be provided.

In an exemplary embodiment, the apparatus may include at least one processor, and at least one memory storing at least one instruction causing the at least one processor to perform a method.

In an exemplary embodiment, the method may include receiving information related to a PRS resource, receiving at least one PRS based on the PRS resource, transmitting information requesting a zero-power configuration for at least a part of the at least one PRS based on the PRS resource, and receiving the at least one PRS at least partially configured with zero power in response to the information requesting the zero-power configuration.

According to various embodiments of the present disclosure, a processor-readable medium storing at least one instruction causing at least one processor to perform a method may be provided.

In an exemplary embodiment, the method may include receiving information related to a PRS resource, receiving at least one PRS based on the PRS resource, transmitting information requesting a zero-power configuration for at least a part of the at least one PRS based on the PRS resource, and receiving the at least one PRS at least partially configured with zero power in response to the information requesting the zero-power configuration.

Various embodiments of the present disclosure as described above are only some of preferred embodiments of the present disclosure, and those skilled in the art may derive and understand many embodiments in which technical features of the various embodiments of the present disclosure are reflected based on the following detailed description.

Advantageous Effects

According to various embodiments of the present disclosure, a method of transmitting and receiving a signal and an apparatus supporting the same in a wireless communication system may be provided.

For example, according to various embodiments of the present disclosure, a positioning method and an apparatus supporting the same in a wireless communication system may be provided.

For example, according to various embodiments of the present disclosure, a method of increasing the positioning accuracy of a user equipment (UE) by allowing the UE to directly request a positioning reference signal (PRS) muting/zero-power configuration, and an apparatus supporting the same may be provided.

For example, according to various embodiments of the present disclosure, a method of, when different PRS resources partially overlap with each other, allowing a PRS muting/zero-power configuration only for the partial overlapped area and thus positioning a UE by using all of the different PRS resources, and an apparatus supporting the same may be provided.

For example, according to various embodiments of the present disclosure, a method of configuring/indicating PRS muting such that a UE may effectively receive a PRS used for UE positioning from a neighboring cell as well as a serving cell, and an apparatus supporting the same may be provided.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the various embodiments of the present disclosure, provide the various embodiments of the present disclosure together with detail explanation. Yet, a technical characteristic the various embodiments of the present disclosure is not limited to a specific drawing. Characteristics disclosed in each of the drawings are combined with each other to configure a new embodiment. Reference numerals in each drawing correspond to structural elements.

MODE FOR DISCLOSURE

Figure 1:
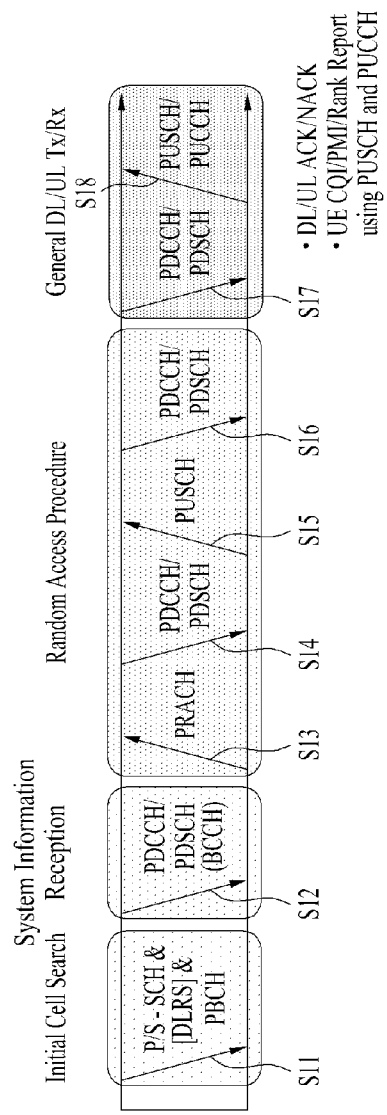
FIG. 1 is a diagram illustrating physical channels and a signal transmission method using the physical channels, which may be used in various embodiments of the present disclosure.

The various embodiments of the present disclosure described below are combinations of elements and features of the various embodiments of the present disclosure in specific forms. The elements or features may be considered selective unless otherwise mentioned. Each element or feature may be practiced without being combined with other elements or features. Further, various embodiments of the present disclosure may be constructed by combining parts of the elements and/or features. Operation orders described in various embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the various embodiments of the present disclosure will be avoided lest it should obscure the subject matter of the various embodiments of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the various embodiments of the present disclosure (more particularly, in the context of the following claims) unless indicated otherwise in the specification or unless context clearly indicates otherwise.

In the various embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an Advanced Base Station (ABS), an access point, etc.

In the various embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an uplink (UL). Likewise, the UE may serve as a reception end and the BS may serve as a transmission end, on a downlink (DL).

Various embodiments of the present disclosure may be supported by standard specifications disclosed for at least one of wireless access systems including an institute of electrical and electronics engineers (IEEE) 802.xx system, a $3^{rd}$ generation partnership project (3GPP) system, a 3GPP long term evolution (LTE) system, a 3GPP $5^{th}$ generation (5G) new RAT (NR) system, or a 3GPP2 system. In particular, various embodiments of the present disclosure may be supported by standard specifications including 3GPP TS 36.211, 3GPP TS 36.212, 3GPP TS 36.213, 3GPP TS 36.300, 3GPP TS 36.321, 3GPP TS 36.331, 3GPP TS 36.355, 3GPP TS 36.455, 3GPP TS 37.355, 3GPP TS 38.211, 3GPP TS 38.212, 3GPP TS 38.213, 3GPP TS 38.214, 3GPP TS 38.215, 3GPP TS 38.300, 3GPP TS 38.321, 3GPP TS 38.331, and 3GPP TS 38.455. That is, steps or parts which are not described in various embodiments of the present disclosure may be described with reference to the above standard specifications. Further, all terms used herein may be described by the standard specifications.

Reference will now be made in detail to the various embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the various embodiments of the present disclosure. However, it will be apparent to those skilled in the art that the specific terms may be replaced with other terms without departing the technical spirit and scope of the various embodiments of the present disclosure.

Hereinafter, 3GPP LTE/LTE-A systems and 3GPP NR system are explained, which are examples of wireless access systems.

The various embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE.

While the various embodiments of the present disclosure are described in the context of 3GPP LTE/LTE-A systems and 3GPP NR system in order to clarify the technical features of the various embodiments of the present disclosure, the various embodiments of the present disclosure is also applicable to an IEEE 802.16e/m system, etc.

1. Overview of 3GPP System

1.1. Physical Channels and General Signal Transmission

In a wireless access system, a UE receives information from a base station on a DL and transmits information to the base station on a UL. The information transmitted and received between the UE and the base station includes general data information and various types of control information. There are many physical channels according to the types/usages of information transmitted and received between the base station and the UE.

FIG. 1 is a diagram illustrating physical channels and a signal transmission method using the physical channels, which may be used in various embodiments of the present disclosure;

When a UE is powered on or enters a new cell, the UE performs initial cell search (S11). The initial cell search involves acquisition of synchronization to a BS. Specifically, the UE synchronizes its timing to the base station and acquires information such as a cell identifier (ID) by receiving a primary synchronization channel (P-SCH) and a secondary synchronization channel (S-SCH) from the BS.

Then the UE may acquire information broadcast in the cell by receiving a physical broadcast channel (PBCH) from the base station.

During the initial cell search, the UE may monitor a DL channel state by receiving a Downlink Reference Signal (DL RS).

After the initial cell search, the UE may acquire more detailed system information by receiving a physical downlink control channel (PDCCH) and receiving on a physical downlink shared channel (PDSCH) based on information of the PDCCH (S12).

Subsequently, to complete connection to the eNB, the UE may perform a random access procedure with the eNB (S13 to S16). In the random access procedure, the UE may transmit a preamble on a physical random access channel (PRACH) (S13) and may receive a PDCCH and a random access response (RAR) for the preamble on a PDSCH associated with the PDCCH (S14). The UE may transmit a PUSCH by using scheduling information in the RAR (S15), and perform a contention resolution procedure including reception of a PDCCH signal and a PDSCH signal corresponding to the PDCCH signal (S16).

When the random access procedure is performed in two steps, steps S13 and S15 may be combined into one operation for a UE transmission, and steps S14 and S16 may be combined into one operation for a BS transmission.

After the above procedure, the UE may receive a PDCCH and/or a PDSCH from the BS (S17) and transmit a physical uplink shared channel (PUSCH) and/or a physical uplink control channel (PUCCH) to the BS (S18), in a general UL/DL signal transmission procedure.

Control information that the UE transmits to the BS is generically called uplink control information (UCI). The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In general, UCI is transmitted periodically on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Radio Frame Structures

Figure 2:
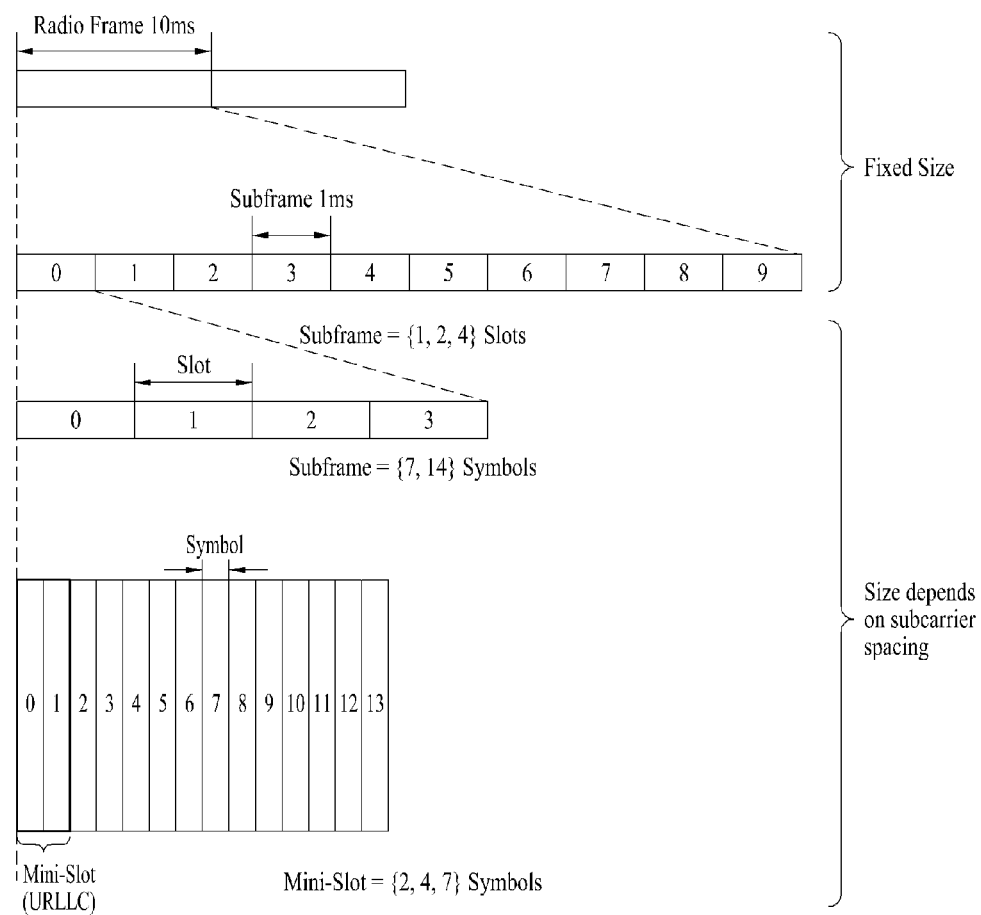
FIG. 2 is a diagram illustrating a radio frame structure in a new radio access technology (NR) system to which various embodiments of the present disclosure are applicable.

FIG. 2 is a diagram illustrating a radio frame structure in an NR system to which various embodiments of the present disclosure are applicable.

The NR system may support multiple numerologies. A numerology may be defined by a subcarrier spacing (SCS) and a cyclic prefix (CP) overhead. Multiple SCSs may be derived by scaling a default SCS by an integer N (or p). Further, even though it is assumed that a very small SCS is not used in a very high carrier frequency, a numerology to be used may be selected independently of the frequency band of a cell. Further, the NR system may support various frame structures according to multiple numerologies.

Now, a description will be given of OFDM numerologies and frame structures which may be considered for the NR system. Multiple OFDM numerologies supported by the NR system may be defined as listed in Table 1. For a bandwidth part, $\mu$ and a CP are obtained from RRC parameters provided by the BS.

TABLE 1

| $\mu$ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In NR, multiple numerologies (e.g., SCSs) are supported to support a variety of 5G services. For example, a wide area in cellular bands is supported for an SCS of 15 kHz, a dense-urban area, a lower latency, and a wider carrier bandwidth are supported for an SCS of 30 kHz/60 kHz, and a larger bandwidth than 24.25 GHz is supported for an SCS of 60 kHz or more, to overcome phase noise.

An NR frequency band is defined by two types of frequency ranges, FR1 and FR2. FR1 may be a sub-6 GHz range, and FR2 may be an above-6 GHz range, that is, a millimeter wave (mmWave) band.

Table 2 below defines the NR frequency band, by way of example.

TABLE 2

| Frequency range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, the time-domain sizes of various fields are represented as multiples of a basic time unit for NR, $T_c = 1/(\Delta f_{max} * N_f)$ where $\Delta f_{max} = 480*10^3$ Hz and a value $N_f$ related to a fast Fourier transform (FFT) size or an inverse fast Fourier transform (IFFT) size is given as $N_f = 4096$. $T_c$ and $T_s$ which is an LTE-based time unit and sampling time, given as $T_s = 1/((15 \text{ kHz})*2048)$ are placed in the following relationship: $T_s/T_c = 64$. DL and UL transmissions are organized into (radio) frames each having a duration of $T_f = (\Delta f_{max} * N_f/100)*T_c = 10$ ms. Each radio frame includes 10 subframes each having a duration of $T_{sf} = (\Delta f_{max} * N_f/1000)*T_c = 1$ ms. There may exist one set of frames for UL and one set of frames for DL. For a numerology $\mu$, slots are numbered with $n^\mu_s \in \{0, \ldots, N^{slot,\mu}_{subframe}-1\}$ in an increasing order in a subframe, and with $n^\mu_{s,f} \in \{0, \ldots, N^{slot,\mu}_{frame}-1\}$ in an increasing order in a radio frame. One slot includes $N^\mu_{symb}$ consecutive OFDM symbols, and $N^\mu_{symb}$ depends on a CP. The start of a slot $n^\mu_s$ in a subframe is aligned in time with the start of an OFDM symbol $n^\mu_s * N^\mu_{symb}$ in the same subframe.

Table 3 lists the number of symbols per slot, the number of slots per frame, and the number of slots per subframe, for each SCS in a normal CP case, and Table 4 lists the number of symbols per slot, the number of slots per frame, and the number of slots per subframe, for each SCS in an extended CP case.

TABLE 3

| μ | $N^{slot}_{symb}$ | $N^{frame, \mu}_{slot}$ | $N^{subframe, \mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N^{slot}_{symb}$ | $N^{frame, \mu}_{slot}$ | $N^{subframe, \mu}_{slot}$ |
|---|---|---|---|
| 2 | 12 | 40 | 4 |

In the above tables, $N^{slot}_{symb}$ represents the number of symbols in a slot, $N^{frame,\mu}_{slot}$ represents the number of slots in a frame, and $N^{subframe,\mu}_{slot}$ represents the number of slots in a subframe.

In the NR system to which various embodiments of the present disclosure are applicable, different OFDM(A) numerologies (e.g., SCSs, CP lengths, and so on) may be configured for a plurality of cells which are aggregated for one UE. Accordingly, the (absolute time) period of a time resource including the same number of symbols (e.g., a subframe (SF), a slot, or a TTI) (generically referred to as a time unit (TU), for convenience) may be configured differently for the aggregated cells.

FIG. 2 illustrates an example with μ=2 (i.e., an SCS of 60 kHz), in which referring to Table 3, one subframe may include four slots. One subframe={1, 2, 4} slots in FIG. 2, which is exemplary, and the number of slot(s) which may be included in one subframe is defined as listed in Table 3 or Table 4.

Further, a mini-slot may include 2, 4 or 7 symbols, fewer symbols than 2, or more symbols than 7.

Figure 3:
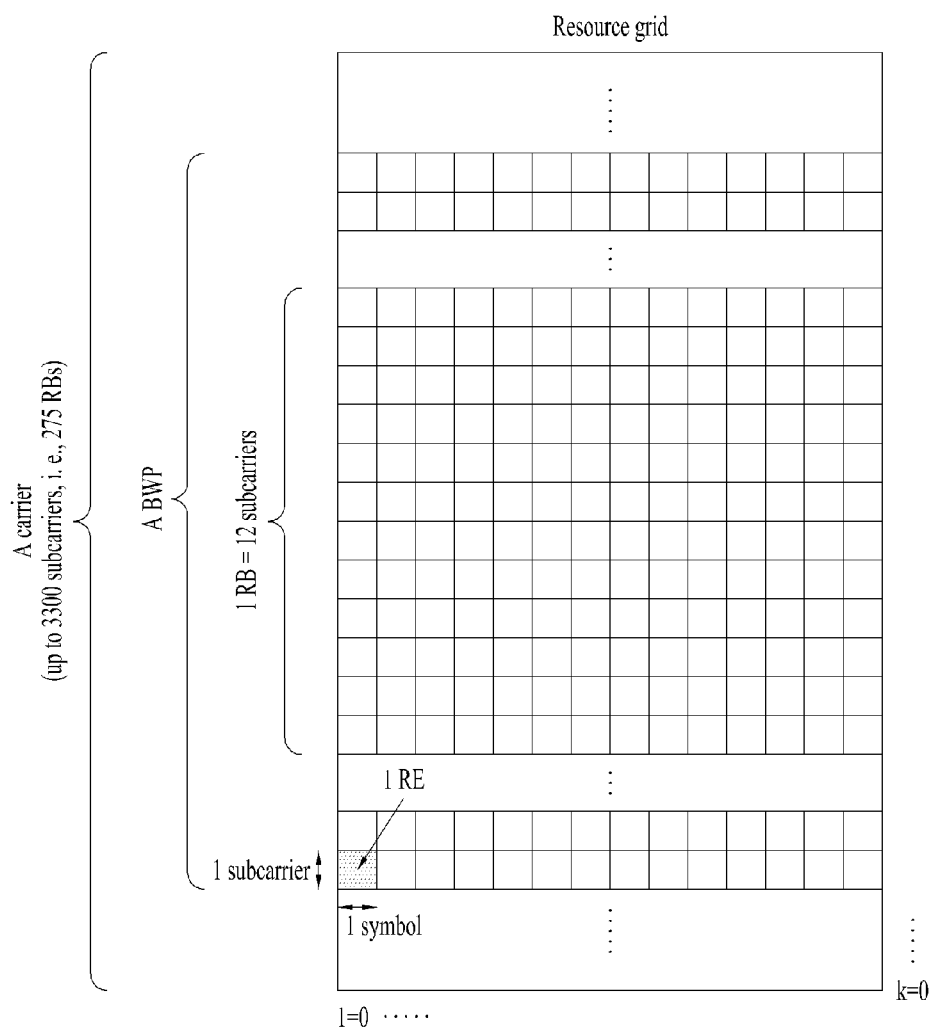
FIG. 3 is a diagram illustrating a slot structure in an NR system to which various embodiments of the present disclosure are applicable.

FIG. 3 is a diagram illustrating a slot structure in an NR system to which various embodiments of the present disclosure are applicable.

Referring FIG. 3, one slot includes a plurality of symbols in the time domain. For example, one slot includes 7 symbols in a normal CP case and 6 symbols in an extended CP case.

A carrier includes a plurality of subcarriers in the frequency domain. An RB is defined by a plurality of (e.g., 12) consecutive subcarriers in the frequency domain.

A bandwidth part (BWP), which is defined by a plurality of consecutive (P)RBs in the frequency domain, may correspond to one numerology (e.g., SCS, CP length, and so on).

A carrier may include up to N (e.g., 5) BWPs. Data communication may be conducted in an activated BWP, and only one BWP may be activated for one UE. In a resource grid, each element is referred to as an RE, to which one complex symbol may be mapped.

Figure 4:
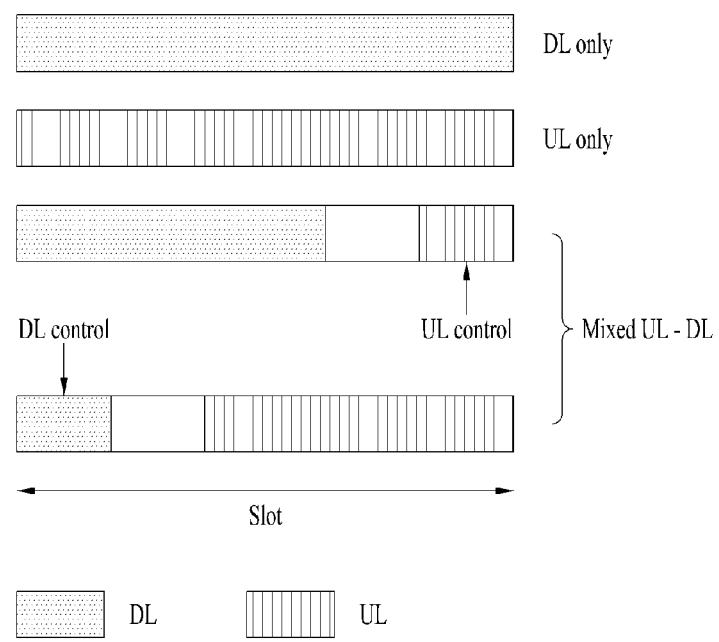
FIG. 4 is a diagram illustrating a self-contained slot structure to which various embodiments of the present disclosure are applicable.

FIG. 4 is a diagram illustrating a self-contained slot structure to which various embodiments of the present disclosure are applicable.

The self-contained slot structure may refer to a slot structure in which all of a DL control channel, DL/UL data, and a UL control channel may be included in one slot.

In FIG. 4, the hatched area (e.g., symbol index=0) indicates a DL control region, and the black area (e.g., symbol index=13) indicates a UL control region. The remaining area (e.g., symbol index=1 to 12) may be used for DL or UL data transmission.

Based on this structure, a BS and a UE may sequentially perform DL transmission and UL transmission in one slot. That is, the BS and UE may transmit and receive not only DL data but also a UL ACK/NACK for the DL data in one slot. Consequently, this structure may reduce a time required until data retransmission when a data transmission error occurs, thereby minimizing the latency of a final data transmission.

In this self-contained slot structure, a predetermined length of time gap is required to allow the BS and the UE to switch from transmission mode to reception mode and vice versa. To this end, in the self-contained slot structure, some OFDM symbols at the time of switching from DL to UL may be configured as a guard period (GP).

Figure 12:
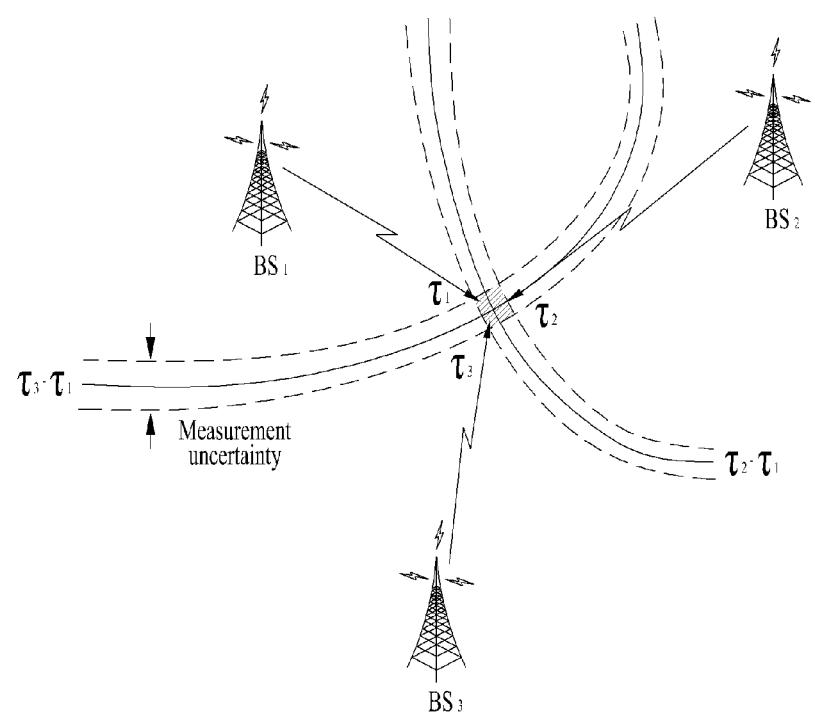
FIG. 12 is a diagram illustrating an observed time difference of arrival (OTDOA) positioning method, to which various embodiments are applicable.

While the self-contained slot structure has been described above as including both of a DL control region and a UL control region, the control regions may selectively be included in the self-contained slot structure. In other words, the self-contained slot structure according to various embodiments of the present disclosure may cover a case of including only the DL control region or the UL control region as well as a case of including both of the DL control region and the UL control region, as illustrated in FIG. 12.

Further, the sequence of the regions included in one slot may vary according to embodiments. For example, one slot may include the DL control region, the DL data region, the UL control region, and the UL data region in this order, or the UL control region, the UL data region, the DL control region, and the DL data region in this order.

A PDCCH may be transmitted in the DL control region, and a PDSCH may be transmitted in the DL data region. A PUCCH may be transmitted in the UL control region, and a PUSCH may be transmitted in the UL data region.

1.3. Channel Structures 1.3.1. DL Channel Structures

The BS transmits related signals to the UE on DL channels as described below, and the UE receives the related signals from the BS on the DL channels.

1.3.1.1. Physical Downlink Shared Channel (PDSCH)

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer together with a demodulation reference signal (DMRS) is mapped to resources, generated as an OFDM symbol signal, and transmitted through a corresponding antenna port.

1.3.1.2. Physical Downlink Control Channel (PDCCH)

The PDCCH may deliver downlink control information (DCI), for example, DL data scheduling information, UL data scheduling information, and so on. The PUCCH may deliver uplink control information (UCI), for example, an acknowledgement/negative acknowledgement (ACK/NACK) information for DL data, channel state information (CSI), a scheduling request (SR), and so on.

The PDCCH carries downlink control information (DCI) and is modulated in quadrature phase shift keying (QPSK). One PDCCH includes 1, 2, 4, 8, or 16 control channel elements (CCEs) according to an aggregation level (AL). One CCE includes 6 resource element groups (REGs). One REG is defined by one OFDM symbol by one (P)RB.

The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

1.3.2. UL Channel Structures

The UE transmits related signals on later-described UL channels to the BS, and the BS receives the related signals on the UL channels from the UE.

1.3.2.1. Physical Uplink Shared Channel (PUSCH)

The PUSCH delivers UL data (e.g., a UL-shared channel transport block (UL-SCH TB)) and/or UCI, in cyclic prefix-orthogonal frequency division multiplexing (CP-OFDM) waveforms or discrete Fourier transform-spread-orthogonal division multiplexing (DFT-s-OFDM) waveforms. If the PUSCH is transmitted in DFT-s-OFDM waveforms, the UE transmits the PUSCH by applying transform precoding. For example, if transform precoding is impossible (e.g., transform precoding is disabled), the UE may transmit the PUSCH in CP-OFDM waveforms, and if transform precoding is possible (e.g., transform precoding is enabled), the UE may transmit the PUSCH in CP-OFDM waveforms or DFT-s-OFDM waveforms. The PUSCH transmission may be scheduled dynamically by a UL grant in DCI or semi-statically by higher-layer signaling (e.g., RRC signaling) (and/or layer 1 (L1) signaling (e.g., a PDCCH)) (a configured grant). The PUSCH transmission may be performed in a codebook-based or non-codebook-based manner.

1.3.2.2. Physical Uplink Control Channel (PUCCH)

The PUCCH delivers UCI, an HARQ-ACK, and/or an SR and is classified as a short PUCCH or a long PUCCH according to the transmission duration of the PUCCH. Table 7 lists exemplary PUCCH formats.

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in a PUCCH resource for a corresponding SR configuration.

PUCCH format 1 conveys UCI of up to 2 bits and modulation symbols of the UCI are spread with an OCC (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 1-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 includes an OCC. Modulation symbols are transmitted in TDM with the DMRS.

1.4. QCL (Quasi Co-Located or Quasi Co-Location)

The UE may receive a list of up to M TCI-State configurations to decode a PDSCH according to a detected PDCCH carrying DCI intended for the UE and a given cell. M depends on a UE capability.

Each TCI-State includes a parameter for establishing a QCL relationship between one or two DL RSs and a PDSCH DMRS port. The QCL relationship is established with an RRC parameter qcl-Type1 for a first DL RS and an RRC parameter qcl-Type2 for a second DL RS (if configured).

The QCL type of each DL RS is given by a parameter 'qcl-Type' included in QCL-Info, and may have one of the following values.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, when a target antenna port is for a specific NZP CSI-RS, corresponding NZP CSI-RS antenna ports may be indicated/configured as QCLed with a specific TRS from the perspective of QCL-Type A and with a specific SSB from the perspective of QCL-Type D. Upon receipt of this indication/configuration, the UE may receive the NZP CSI-RS using a Doppler value and a delay value which are measured in a QCL-TypeA TRS, and apply an Rx beam used to receive a QCL-Type D SSB for reception of the NZP CSI-RS.

1.5. UL-DL Timing Relationship

Figure 5:
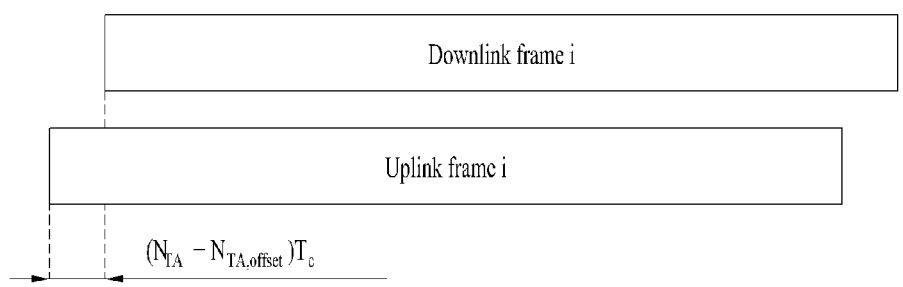
FIG. 5 is a diagram illustrating an exemplary UL-DL timing relationship, which is applicable to various embodiments of the present disclosure.

FIG. 5 is a diagram illustrating an exemplary UL-DL timing relationship applicable to various embodiments of the present disclosure.

Referring to FIG. 5, a UE starts to transmit UL frame i $T_{TA}(=(N_{TA}+N_{TA,offset})T_c)$ seconds before a DL radio frame corresponding to UL frame i. However, $T_{TA}=0$ exceptionally for a msgA transmission on a PUSCH. $T_c=0.509$ ns The UE may be provided with a value $N_{TA,offset}$ of a timing advance (TA) offset for a serving cell by n-TimingAdvanceOffset for the serving cell. When the UE is not provided with n-TimingAdvanceOffset for the serving cell, the UE may determine a default value $N_{TA,offset}$ of the TA offset for the serving cell.

In the case of a random access response, a TA command, $T_A$ for a timing advance group (TAG) indicates $N_{TA}$ values by index values of $T_A=0, 1, 2, \ldots, 3846$, where an amount of the time alignment for a TAG with an SCS of $2^\mu*15$ kHz is $N_{TA}$ ($=T_A*16*64/2^\mu$). $N_{TA}$ is relative to the SCS of a first UL transmission from the UE after reception of a random access response.

In other cases, a TA command, $T_A$ for a TAG indicates adjustment of a current $N_{TA}$ value, $N_{TA\_old}$ to a new $N_{TA}$ value, $N_{TA\_new}$ by index values of $T_A$ (=0, 1, 2, \ldots, 63), where for a SCS of $2^\mu*15$ kHz, $N_{TA\_new}=N_{TA\_old}$ $(T_A-31)*16*64/2^\mu$.

2. Positioning

Positioning may be a process of determining the geographical location and/or speed of a UE based on the measurement of a radio signal. A client (e.g., application) related to the UE may request location information, and the location information may be reported to the client. The location information may be included in a core network or requested by the client connected to the core network. The location information may be reported in a standard format such as cell-based or geographical coordinates. Herein, an estimation error of the location and speed of the UE and/or a positioning method used for the positioning may also be reported.

2.1. Positioning Protocol Configuration

Figure 6:
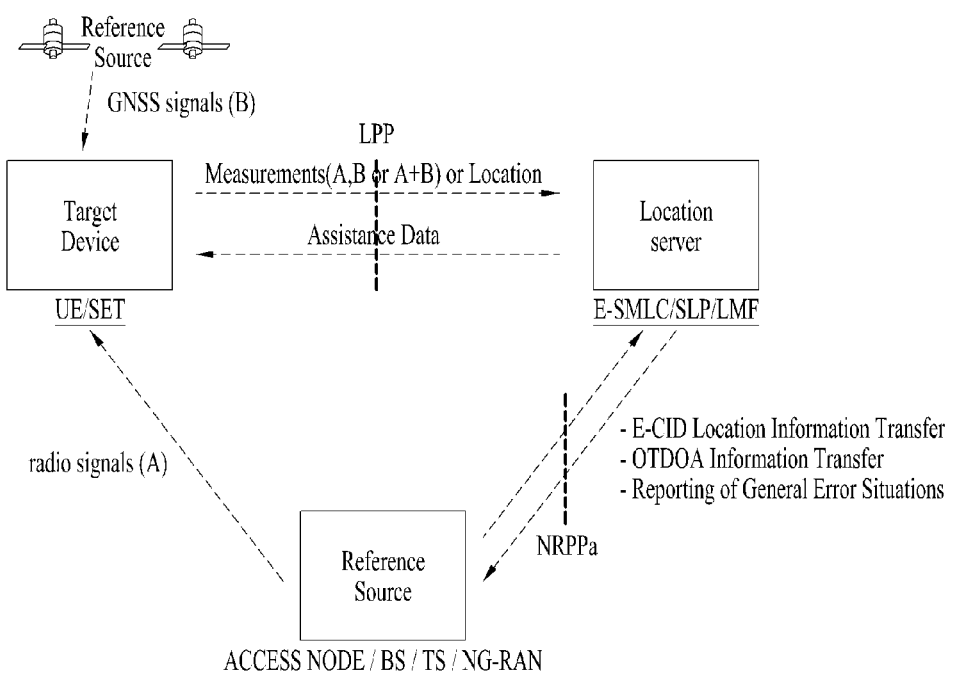
FIG. 6 is a diagram illustrating an exemplary positioning protocol configuration for UE positioning, which is applicable to various embodiments of the present disclosure.
Figure 7:
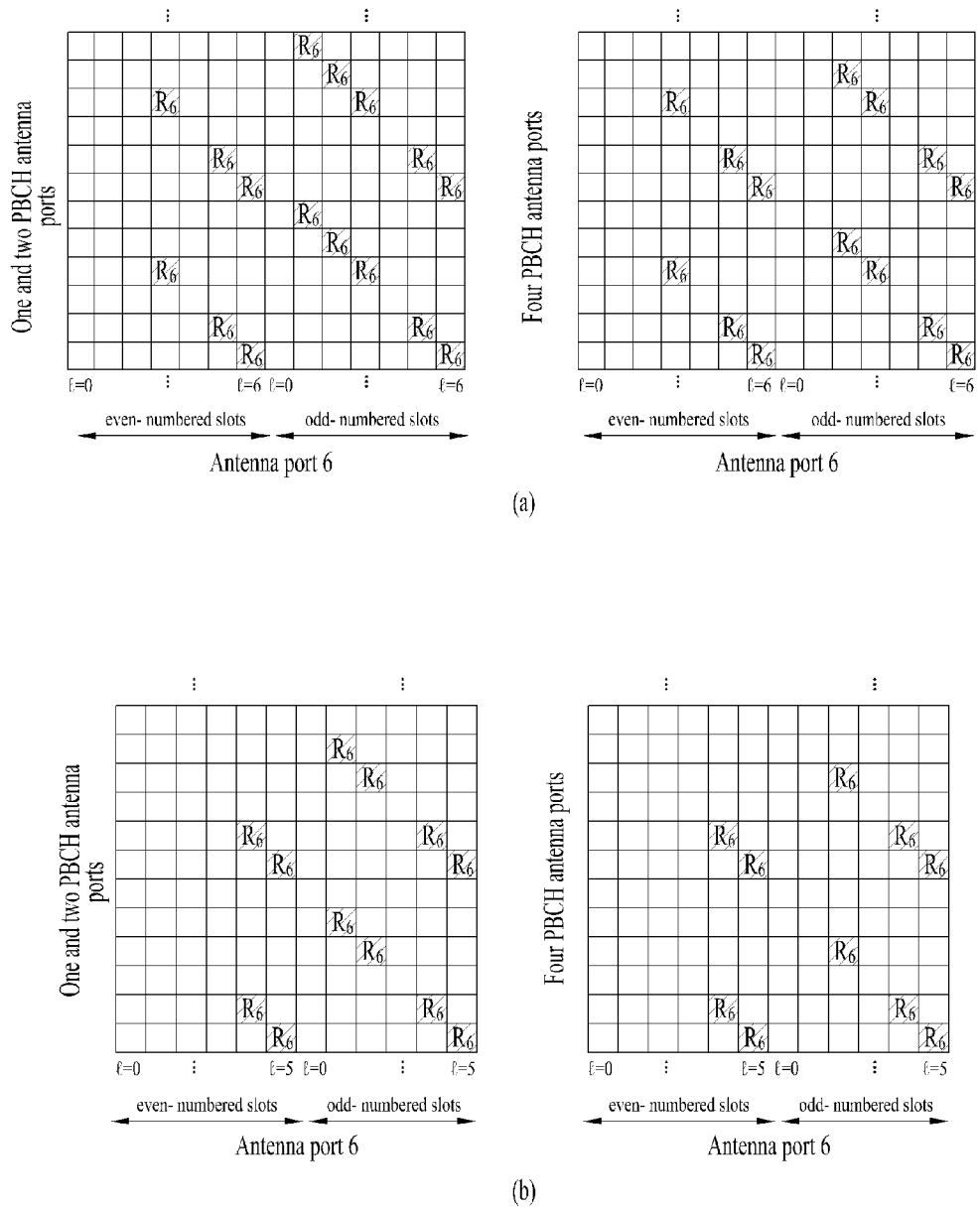
FIG. 7 illustrates exemplary mapping of a positioning reference signal (PRS) in a long term evolution (LTE) system to which various embodiments of the present disclosure are applicable.

FIG. 6 is a diagram illustrating an exemplary positioning protocol configuration for UE positioning, to which various embodiments of the present disclosure are applicable.

Referring to FIG. 6, an LTE positioning protocol (LPP) may be used as a point-to-point protocol between a location server (E-SMLC and/or SLP and/or LMF) and a target device (UE and/or SET) in order to position a target device based on positioning-related measurements obtained from one or more reference sources. The target device and the location server may exchange measurements and/or location information based on signal A and/or signal B through the LPP.

NR positioning protocol A (NRPPa) may be used for exchanging information between a reference source (access node and/or BS and/or TP and/or NG-RAN node) and a location server.

NRPPa may provide the following functions:
- E-CID Location Information Transfer. This function allows exchange of location information between a reference source and an LMF, for the purpose of E-CID positioning.
- OTDOA Information Transfer. This function allows exchange of information between the reference source and the LMF for the purpose of OTDOA positioning.
- Reporting of General Error Situations. This function allows reporting of general error situations, for which function specific error messages have not been defined.

2.2. PRS in LTE System

For such positioning, a positioning reference signal (PRS) may be used. The PRS is a reference signal used to estimate the position of the UE.

For example, in the LTE system, the PRS may be transmitted only in a DL subframe configured for PRS transmission (hereinafter, "positioning subframe"). If both a multimedia broadcast single frequency network (MBSFN) subframe and a non-MBSFN subframe are configured as positioning subframes, OFDM symbols of the MBSFN subframe should have the same cyclic prefix (CP) as subframe #0. If only MBSFN subframes are configured as the positioning subframes within a cell, OFDM symbols configured for the PRS in the MBSFN subframes may have an extended CP.

The sequence of the PRS may be defined by Equation 1 below.

$$r_{l,n_s}(m) = \frac{1}{\sqrt{2}}(1 - 2 \cdot c(2m)) + j\frac{1}{\sqrt{2}}(1 - 2 \cdot c(2m+1)),$$
$$m = 0, 1, \ldots, 2N_{RB}^{max,DL} - 1$$

[Equation 1]

In Equation 1, $n_s$ denotes a slot number in a radio frame and l denotes an OFDM symbol number in a slot. $N_{RB}^{max,DL}$ is the largest of DL bandwidth configurations, expressed as $N_{SC}^{RB}$. $N_{RC}^{RB}$ denotes the size of an RB in the frequency domain, for example, 12 subcarriers.

c(i) denotes a pseudo-random sequence and may be initialized by Equation 2 below.

$$c_{init} = 2^{28} \cdot \lfloor N_{ID}^{PRS}/512 \rfloor + 2^{10} \cdot (7 \cdot (n_s+1)+l+1) \cdot (2 \cdot (N_{ID}^{PRS} \bmod 512)+1) + 2 \cdot (N_{ID}^{PRS} \bmod 512) + N_{CP}$$

[Equation 2]

Unless additionally configured by higher layers, $N_{ID}^{PRS}$ is equal to $N_{ID}^{cell}$, and $N_{CP}$ is 1 for a normal CP and 0 for an extended CP.

Figure 11:
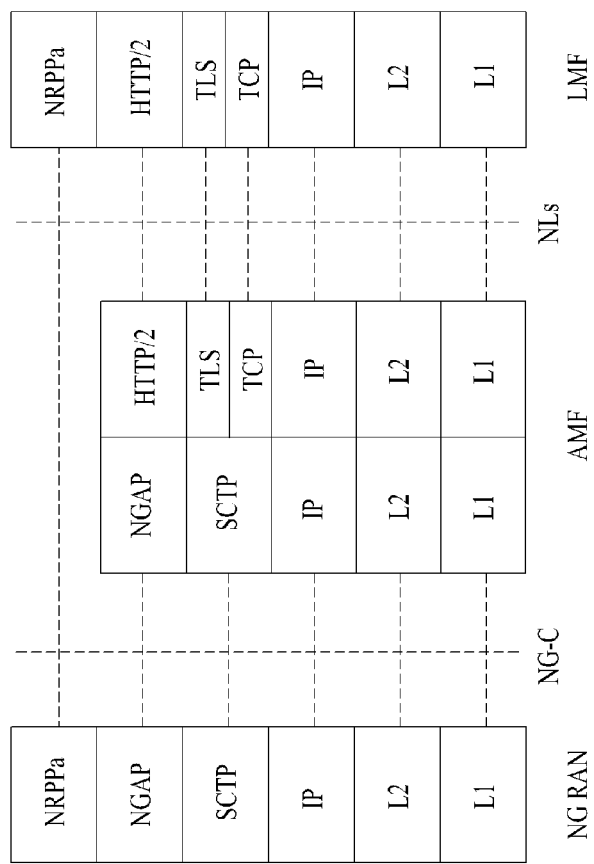
FIG. 11 is a diagram illustrating protocol layers for supporting NR positioning protocol A (NRPPa) protocol data unit (PDU) transmission, to which various embodiments are applicable.

FIG. 11 illustrates an exemplary pattern to which a PRS is mapped in a subframe.

As illustrated in FIG. 11, the PRS may be transmitted through an antenna port 6. FIG. 11(*a*) illustrates mapping of the PRS in the normal CP and FIG. 11(*b*) illustrates mapping of the PRS in the extended CP.

The PRS may be transmitted in consecutive subframes grouped for position estimation. The subframes grouped for position estimation are referred to as a positioning occasion. The positioning occasion may consist of 1, 2, 4 or 6 subframe. The positioning occasion may occur periodically with a periodicity of 160, 320, 640 or 1280 subframes. A cell-specific subframe offset value may be defined to indicate the starting subframe of PRS transmission. The offset value and the periodicity of the positioning occasion for PRS transmission may be derived from a PRS configuration index as listed in Table 11 below.

TABLE 5

| PRS configuration Index ($I_{PRS}$) | PRS periodicity (subframes) | PRS subframe offset (subframes) |
|---|---|---|
| 0-159 | 160 | $I_{PRS}$ |
| 160-479 | 320 | $I_{PRS}$-160 |
| 480-1119 | 640 | $I_{PRS}$-480 |
| 1120-2399 | 1280 | $I_{PRS}$-1120 |
| 2400-2404 | 5 | $I_{PRS}$-2400 |
| 2405-2414 | 10 | $I_{PRS}$-2405 |
| 2415-2434 | 20 | $I_{PRS}$-2415 |
| 2435-2474 | 40 | $I_{PRS}$-2435 |
| 2475-2554 | 80 | $I_{PRS}$-2475 |
| 2555-4095 | Reserved | |

A PRS included in each positioning occasion is transmitted with constant power. A PRS in a certain positioning occasion may be transmitted with zero power, which is referred to as PRS muting. For example, when a PRS transmitted by a serving cell is muted, the UE may easily detect a PRS of a neighbor cell.

The PRS muting configuration of a cell may be defined by a periodic muting sequence consisting of 2, 4, 8 or 16 positioning occasions. That is, the periodic muting sequence may include 2, 4, 8, or 16 bits according to a positioning occasion corresponding to the PRS muting configuration and each bit may have a value "0" or "1". For example, PRS muting may be performed in a positioning occasion with a bit value of "0".

The positioning subframe is designed as a low-interference subframe so that no data is transmitted in the positioning subframe. Therefore, the PRS is not subjected to interference due to data transmission although the PRS may interfere with PRSs of other cells.

2.3. UE Positioning Architecture in NR System

Figure 8:
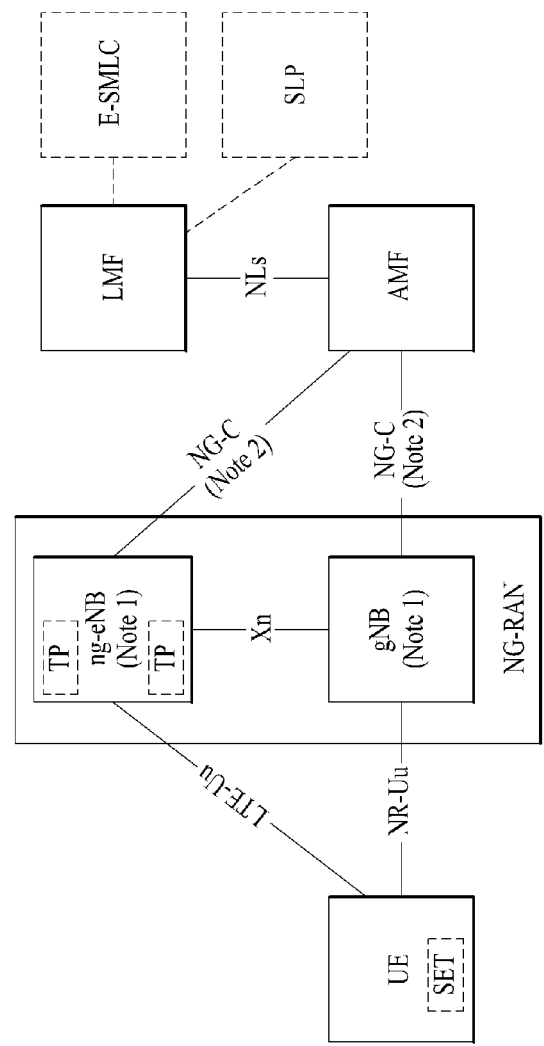
FIG. 8 is a diagram illustrating an example of an architecture of a system for positioning a UE, to which various embodiments of the present disclosure are applicable.

FIG. 8 illustrates architecture of a 5G system applicable to positioning of a UE connected to an NG-RAN or an E-UTRAN.

Referring to FIG. 8, an AMF may receive a request for a location service associated with a particular target UE from another entity such as a gateway mobile location center (GMLC) or the AMF itself decides to initiate the location service on behalf of the particular target UE. Then, the AMF transmits a request for a location service to a location management function (LMF). Upon receiving the request for the location service, the LMF may process the request for the location service and then returns the processing result including the estimated position of the UE to the AMF. In the case of a location service requested by an entity such as the GMLC other than the AMF, the AMF may transmit the processing result received from the LMF to this entity.

A new generation evolved-NB (ng-eNB) and a gNB are network elements of the NG-RAN capable of providing a measurement result for positioning. The ng-eNB and the gNB may measure radio signals for a target UE and transmits a measurement result value to the LMF. The ng-eNB may control several TPs, such as remote radio heads, or PRS-only TPs for support of a PRS-based beacon system for E-UTRA.

The LMF is connected to an enhanced serving mobile location center (E-SMLC) which may enable the LMF to access the E-UTRAN. For example, the E-SMLC may enable the LMF to support OTDOA, which is one of positioning methods of the E-UTRAN, using DL measurement obtained by a target UE through signals transmitted by eNBs and/or PRS-only TPs in the E-UTRAN.

The LMF may be connected to an SUPL location platform (SLP). The LMF may support and manage different location services for target UEs. The LMF may interact with a serving ng-eNB or a serving gNB for a target UE in order to obtain position measurement for the UE. For positioning of the target UE, the LMF may determine positioning methods, based on a location service (LCS) client type, required quality of service (QoS), UE positioning capabilities, gNB positioning capabilities, and ng-eNB positioning capabilities, and then apply these positioning methods to the serving gNB and/or serving ng-eNB. The LMF may determine additional information such as accuracy of the location estimate and velocity of the target UE. The SLP is a secure user plane location (SUPL) entity responsible for positioning over a user plane.

The UE may measure the position thereof using DL RSs transmitted by the NG-RAN and the E-UTRAN. The DL RSs transmitted by the NG-RAN and the E-UTRAN to the UE may include a SS/PBCH block, a CSI-RS, and/or a PRS. Which DL RS is used to measure the position of the UE may conform to configuration of LMF/E-SMLC/ng-eNB/E-UTRAN etc. The position of the UE may be measured by an RAT-independent scheme using different global navigation satellite systems (GNSSs), terrestrial beacon systems (TBSs), WLAN access points, Bluetooth beacons, and sensors (e.g., barometric sensors) installed in the UE. The UE may also contain LCS applications or access an LCS application through communication with a network accessed thereby or through another application contained therein. The LCS application may include measurement and calculation functions needed to determine the position of the UE. For example, the UE may contain an independent positioning function such as a global positioning system (GPS) and report the position thereof, independent of NG-RAN transmission. Such independently obtained positioning information may be used as assistance information of positioning information obtained from the network.

2.4. Operation for UE Positioning

Figure 9:
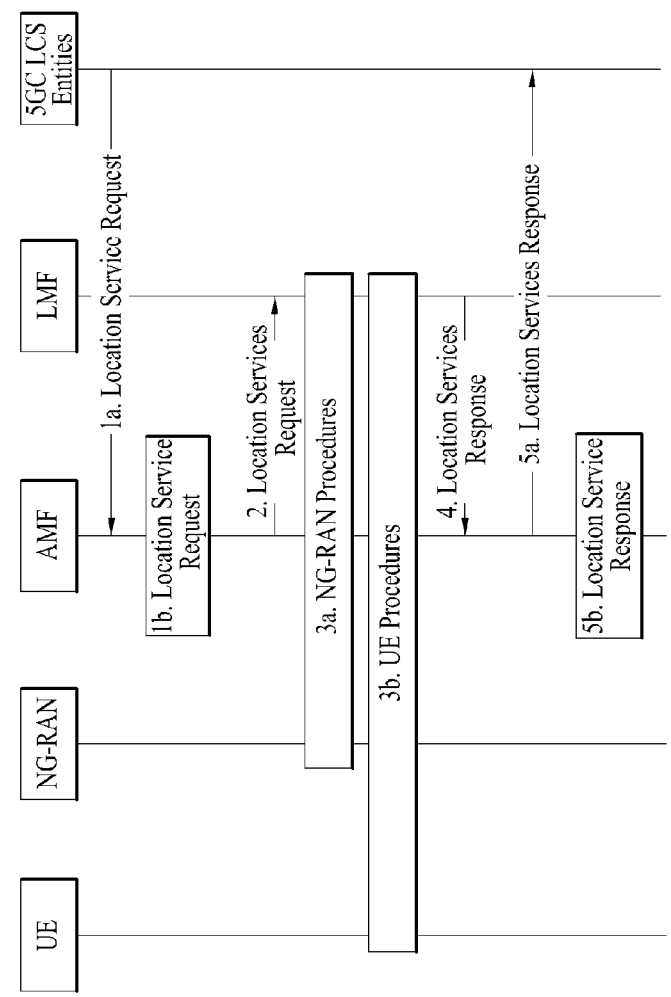
FIG. 9 is a diagram illustrating an example of a procedure of positioning a UE, to which various embodiments of the present disclosure are applicable.

FIG. 9 illustrates an implementation example of a network for UE positioning.

When an AMF receives a request for a location service in the case in which the UE is in connection management (CM)-IDLE state, the AMF may make a request for a network triggered service in order to establish a signaling connection with the UE and to assign a specific serving gNB or ng-eNB. This operation procedure is omitted in FIG. 9. In other words, in FIG. 9 it may be assumed that the UE is in a connected mode. However, the signaling connection may be released by an NG-RAN as a result of signaling and data inactivity while a positioning procedure is still ongoing.

An operation procedure of the network for UE positioning will now be described in detail with reference to FIG. 9. In step 1a, a 5GC entity such as GMLC may transmit a request for a location service for measuring the position of a target UE to a serving AMF. Here, even when the GMLC does not make the request for the location service, the serving AMF may determine the need for the location service for measuring the position of the target UE according to step 1b. For example, the serving AMF may determine that itself will perform the location service in order to measure the position of the UE for an emergency call.

In step 2, the AMF transfers the request for the location service to an LMF. In step 3a, the LMF may initiate location procedures with a serving ng-eNB or a serving gNB to obtain location measurement data or location measurement assistance data. For example, the LMF may transmit a request for location related information associated with one or more UEs to the NG-RAN and indicate the type of necessary location information and associated QoS. Then, the NG-RAN may transfer the location related information to the LMF in response to the request. In this case, when a location determination method according to the request is an enhanced cell ID (E-CID) scheme, the NG-RAN may transfer additional location related information to the LMF in one or more NR positioning protocol A (NRPPa) messages. Here, the "location related information" may mean all values used for location calculation such as actual location estimate information and radio measurement or location measurement. Protocol used in step 3a may be an NRPPa protocol which will be described later.

Additionally, in step 3b, the LMF may initiate a location procedure for DL positioning together with the UE. For example, the LMF may transmit the location assistance data to the UE or obtain a location estimate or location measurement value. For example, in step 3b, a capability information transfer procedure may be performed. Specifically, the LMF may transmit a request for capability information to the UE and the UE may transmit the capability information to the LMF. Here, the capability information may include information about a positioning method supportable by the LFM or the UE, information about various aspects of a particular positioning method, such as various types of assistance data for an A-GNSS, and information about common features not specific to any one positioning method, such as ability to handle multiple LPP transactions. In some cases, the UE may provide the capability information to the LMF although the LMF does not transmit a request for the capability information.

As another example, in step 3b, a location assistance data transfer procedure may be performed. Specifically, the UE may transmit a request for the location assistance data to the LMF and indicate particular location assistance data needed to the LMF. Then, the LMF may transfer corresponding location assistance data to the UE and transfer additional assistance data to the UE in one or more additional LTE positioning protocol (LPP) messages. The location assistance data delivered from the LMF to the UE may be transmitted in a unicast manner In some cases, the LMF may transfer the location assistance data and/or the additional assistance data to the UE without receiving a request for the assistance data from the UE.

As another example, in step 3b, a location information transfer procedure may be performed. Specifically, the LMF may send a request for the location (related) information associated with the UE to the UE and indicate the type of necessary location information and associated QoS. In response to the request, the UE may transfer the location related information to the LMF. Additionally, the UE may transfer additional location related information to the LMF in one or more LPP messages. Here, the "location related information" may mean all values used for location calculation such as actual location estimate information and radio measurement or location measurement. Typically, the location related information may be a reference signal time difference (RSTD) value measured by the UE based on DL RSs transmitted to the UE by a plurality of NG-RANs and/or E-UTRANs. Similarly to the above description, the UE may transfer the location related information to the LMF without receiving a request from the LMF.

The procedures implemented in step 3b may be performed independently but may be performed consecutively. Generally, although step 3b is performed in order of the capability information transfer procedure, the location assistance data transfer procedure, and the location information transfer procedure, step 3b is not limited to such order. In other words, step 3b is not required to occur in specific order in order to improve flexibility in positioning. For example, the UE may request the location assistance data at any time in order to perform a previous request for location measurement made by the LMF. The LMF may also request location information, such as a location measurement value or a location estimate value, at any time, in the case in which location information transmitted by the UE does not satisfy required QoS. Similarly, when the UE does not perform measurement for location estimation, the UE may transmit the capability information to the LMF at any time.

In step 3b, when information or requests exchanged between the LMF and the UE are erroneous, an error message may be transmitted and received and an abort message for aborting positioning may be transmitted and received.

Protocol used in step 3b may be an LPP protocol which will be described later.

Step 3b may be performed additionally after step 3a but may be performed instead of step 3a.

In step 4, the LMF may provide a location service response to the AMF. The location service response may include information as to whether UE positioning is successful and include a location estimate value of the UE. If the procedure of FIG. 9 has been initiated by step 1a, the AMF may transfer the location service response to a 5GC entity such as a GMLC. If the procedure of FIG. 9 has been initiated by step 1b, the AMF may use the location service response in order to provide a location service related to an emergency call.

2.5. Positioning Protocol
2.5.1. LTE Positioning Protocol (LPP)

Figure 10:
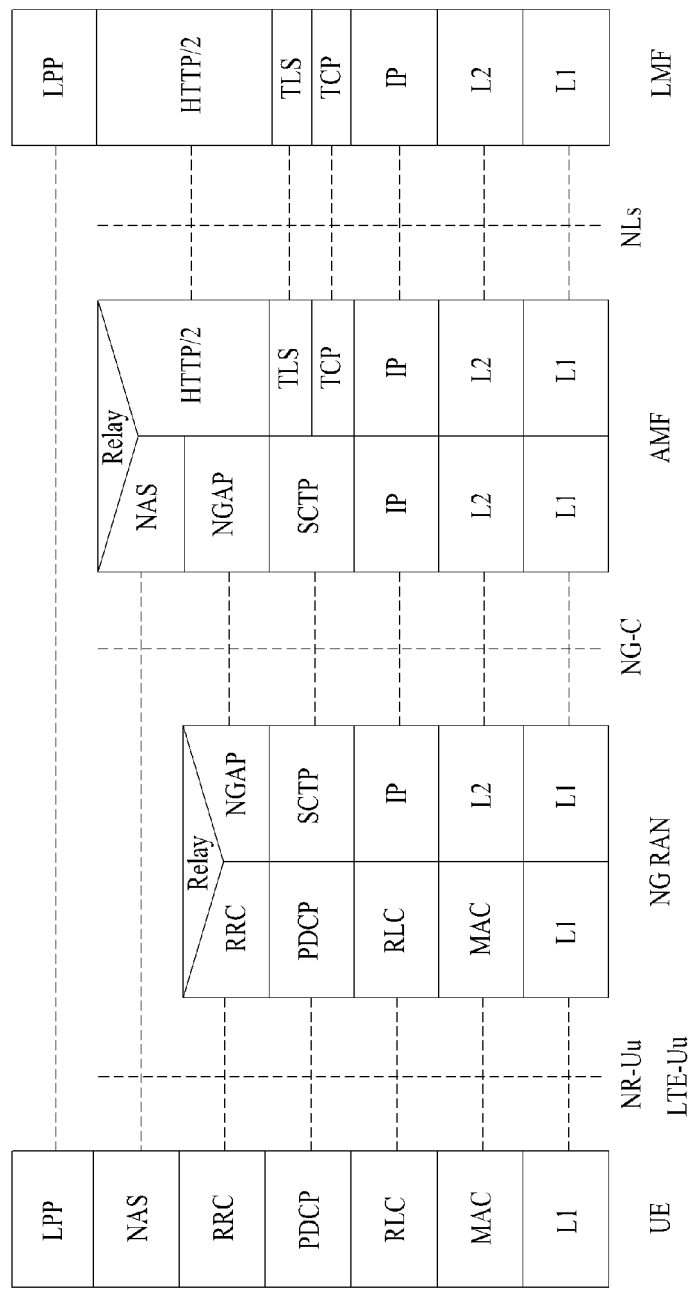
FIG. 10 is a diagram illustrating protocol layers for supporting LTE positioning protocol (LPP) message transmission, to which various embodiments are applicable.

FIG. 10 illustrates an exemplary protocol layer used to support LPP message transfer between an LMF and a UE.

An LPP protocol data unit (PDU) may be carried in a NAS PDU between an AMF and the UE.

Referring to FIG. 10, LPP is terminated between a target device (e.g., a UE in a control plane or an SUPL enabled terminal (SET) in a user plane) and a location server (e.g., an LMF in the control plane or an SLP in the user plane). LPP messages may be carried as transparent PDUs cross intermediate network interfaces using appropriate protocols, such an NGAP over an NG-C interface and NAS/RRC over LTE-Uu and NR-Uu interfaces. LPP is intended to enable positioning for NR and LTE using various positioning methods.

For example, a target device and a location server may exchange, through LPP, capability information therebetween, assistance data for positioning, and/or location information. The target device and the location server may exchange error information and/or indicate abort of an LPP procedure, through an LPP message.

2.5.2. NR Positioning Protocol A (NRPPa)

FIG. 11 illustrates an exemplary protocol layer used to support NRPPa PDU transfer between an LMF and an NG-RAN node.

NRPPa may be used to carry information between an NG-RAN node and an LMF. Specifically, NRPPa may carry an E-CID for measurement transferred from an ng-eNB to an LMF, data for support of an OTDOA positioning method, and a cell-ID and a cell position ID for support of an NR cell ID positioning method. An AMF may route NRPPa PDUs based on a routing ID of an involved LMF over an NG-C interface without information about related NRPPa transaction.

An NRPPa procedure for location and data collection may be divided into two types. The first type is a UE associated procedure for transfer of information about a particular UE (e.g., location measurement information) and the second type is a non-UE-associated procedure for transfer of information applicable to an NG-RAN node and associated TPs (e.g., gNB/ng-eNB/TP timing information). The two types may be supported independently or may be supported simultaneously.

2.6. Positioning Measurement Method

Positioning methods supported in the NG-RAN may include a GNSS, an OTDOA, an E-CID, barometric sensor positioning, WLAN positioning, Bluetooth positioning, a TBS, uplink time difference of arrival (UTDOA) etc. Although any one of the positioning methods may be used for UE positioning, two or more positioning methods may be used for UE positioning.

2.6.1. OTDOA (Observed Time Difference of Arrival)

FIG. 12 is a diagram illustrating an observed time difference of arrival (OTDOA) positioning method, to which various embodiments are applicable;

The OTDOA positioning method uses time measured for DL signals received from multiple TPs including an eNB, an ng-eNB, and a PRS-only TP by the UE. The UE measures time of received DL signals using location assistance data received from a location server. The position of the UE may be determined based on such a measurement result and geographical coordinates of neighboring TPs.

The UE connected to the gNB may request measurement gaps to perform OTDOA measurement from a TP. If the UE is not aware of an SFN of at least one TP in OTDOA assistance data, the UE may use autonomous gaps to obtain an SFN of an OTDOA reference cell prior to requesting measurement gaps for performing reference signal time difference (RSTD) measurement.

Here, the RSTD may be defined as the smallest relative time difference between two subframe boundaries received from a reference cell and a measurement cell. That is, the RSTD may be calculated as the relative time difference between the start time of a subframe received from the measurement cell and the start time of a subframe from the reference cell that is closest to the subframe received from the measurement cell. The reference cell may be selected by the UE.

For accurate OTDOA measurement, it is necessary to measure time of arrival (ToA) of signals received from geographically distributed three or more TPs or BSs. For example, ToA for each of TP 1, TP 2, and TP 3 may be measured, and RSTD for TP 1 and TP 2, RSTD for TP 2 and TP 3, and RSTD for TP 3 and TP 1 are calculated based on three ToA values. A geometric hyperbola is determined based on the calculated RSTD values and a point at which curves of the hyperbola cross may be estimated as the position of the UE. In this case, accuracy and/or uncertainty for each ToA measurement may occur and the estimated position of the UE may be known as a specific range according to measurement uncertainty.

For example, RSTD for two TPs may be calculated based on Equation 3 below.

$$RSTDi,1 \frac{-\sqrt{(x_t - x_i)^2 + (y_t - y_i)^2}}{c} - \frac{\sqrt{(x_t - x_1)^2 + (y_t - y_1)^2}}{c} + (T_i - T_1) + (n_i - n_1)$$ [Equation 3]

In Equation 3, c is the speed of light, $\{x_t, y_t\}$ are (unknown) coordinates of a target UE, $\{x_i, y_i\}$ are (known) coordinates of a TP, and $\{x_1, y_1\}$ are coordinates of a reference TP (or another TP). Here, $(T_i - T_1)$ is a transmission time offset between two TPs, referred to as "real time differences" (RTDs), and $n_i$ and $n_1$ are UE ToA measurement error values.

2.6.2. E-CID (Enhanced Cell ID)

In a cell ID (CID) positioning method, the position of the UE may be measured based on geographical information of a serving ng-eNB, a serving gNB, and/or a serving cell of the UE. For example, the geographical information of the serving ng-eNB, the serving gNB, and/or the serving cell may be acquired by paging, registration, etc.

The E-CID positioning method may use additional UE measurement and/or NG-RAN radio resources in order to improve UE location estimation in addition to the CID positioning method. Although the E-CID positioning method partially may utilize the same measurement methods as a measurement control system on an RRC protocol, additional measurement only for UE location measurement is not generally performed. In other words, an additional measurement configuration or measurement control message may not be provided for UE location measurement. The UE does not expect that an additional measurement operation only for location measurement will be requested and the UE may report a measurement value obtained by generally measurable methods.

For example, the serving gNB may implement the E-CID positioning method using an E-UTRA measurement value provided by the UE.

Measurement elements usable for E-CID positioning may be, for example, as follows.

UE measurement: E-UTRA reference signal received power (RSRP), E-UTRA reference signal received quality (RSRQ), UE E-UTRA reception (Rx)-transmission (Tx) time difference, GERAN/WLAN reference signal strength indication (RSSI), UTRAN common pilot channel (CPICH) received signal code power (RSCP), and/or UTRAN CPICH Ec/Io E-UTRAN measurement: ng-eNB Rx-Tx time difference, timing advance ($T_{ADV}$), and/or AoA Here, $T_{ADV}$ may be divided into Type 1 and Type 2 as follows.

$T_{ADV}$ Type 1=(ng-eNB Rx-Tx time difference)+(UE E-UTRA Rx-Tx time difference)

$T_{ADV}$ Type 2=ng-eNB Rx-Tx time difference

AoA may be used to measure the direction of the UE. AoA is defined as the estimated angle of the UE counterclockwise from the eNB/TP. In this case, a geographical reference direction may be north. The eNB/TP may use a UL signal such as an SRS and/or a DMRS for AoA measurement. The accuracy of measurement of AoA increases as the arrangement of an antenna array increases. When antenna arrays are arranged at the same interval, signals received at adjacent antenna elements may have constant phase rotate.

2.6.3. UTDOA (Uplink Time Difference of Arrival)

UTDOA is to determine the position of the UE by estimating the arrival time of an SRS. When an estimated SRS arrival time is calculated, a serving cell is used as a reference cell and the position of the UE may be estimated by the arrival time difference with another cell (or an eNB/TP). To implement UTDOA, an E-SMLC may indicate the serving cell of a target UE in order to indicate SRS transmission to the target UE. The E-SMLC may provide configurations such as periodic/non-periodic SRS, bandwidth, and frequency/group/sequence hopping.

2.6.4. Multi RTT (Multi-Cell RTT)

Compared to OTDOA positioning requiring fine synchronization (e.g., at the nano-second level) between TPs in the network, RTT positioning requires only coarse timing TRP (e.g., BS) synchronization although it is based on TOA measurements like OTDOA positioning.

Figure 13:
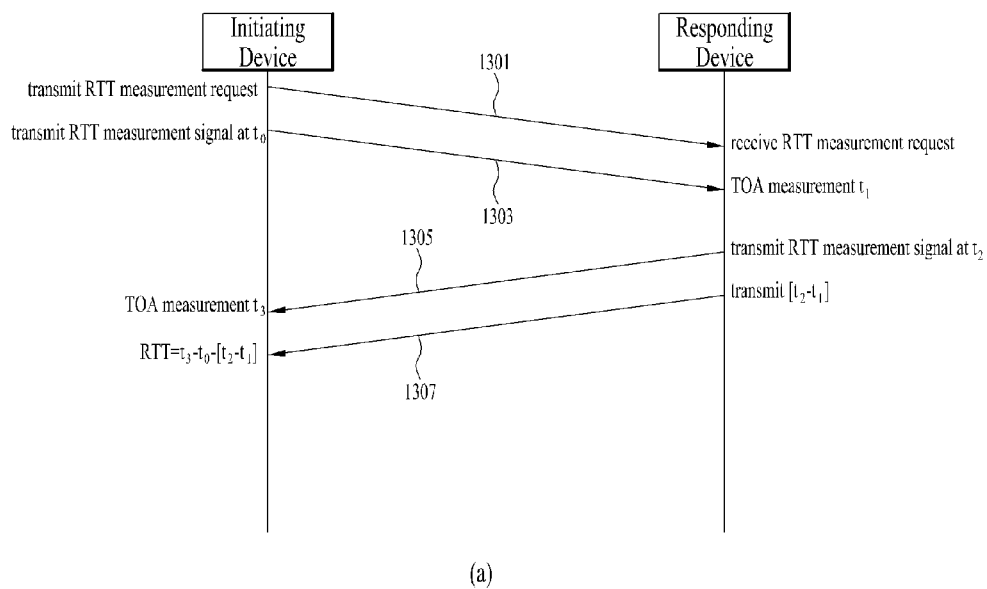
FIG. 13 is a diagram illustrating a multi-round trip time (multi-RTT) positioning method to which various embodiments are applicable.
Figure 13:
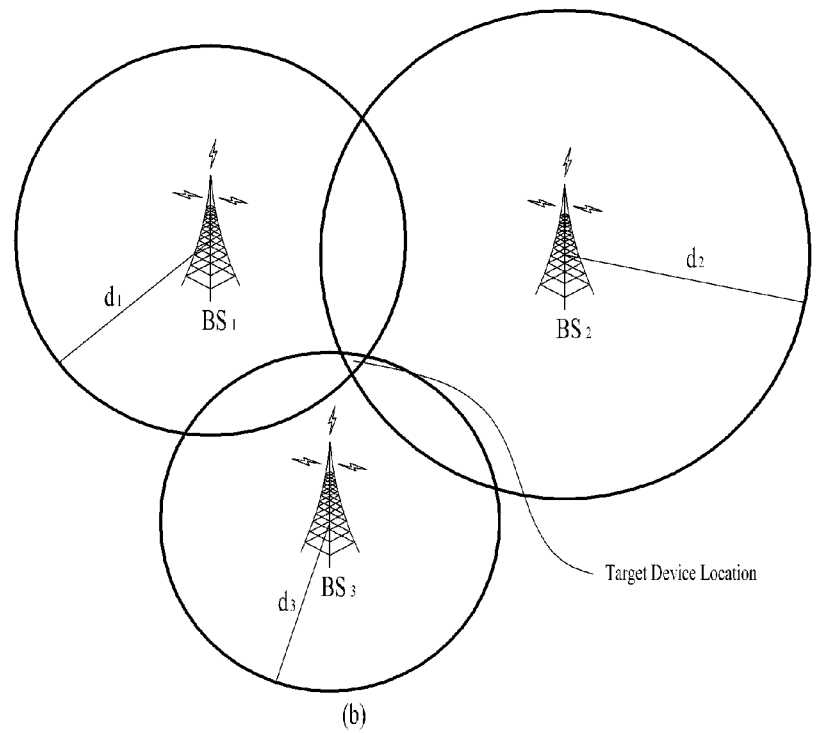

FIG. 13 is a diagram illustrating an exemplary multi-RTT positioning method to which various embodiments of the present disclosure are applicable.

Referring to FIG. 13(a), an RTT process is illustrated, in which an initiating device and a responding device perform TOA measurement, and the responding device provides a TOA measurement to the initiating device, for RTT measurement (calculation). For example, the initiating device may be a TRP and/or a UE, and the responding device may be a UE and/or a TRP.

In operation 1701 according to an exemplary embodiment, the initiating device may transmit an RTT measurement request, and the responding device may receive the RTT measurement request.

In operation 1703 according to an exemplary embodiment, the initiating device may transmit an RTT measurement signal at time to, and the responding device may obtain TOA measurement $t_1$.

In operation 1705 according to an exemplary embodiment, the responding device may transmit an RTT measurement signal at time $t_2$, and the initiating device may obtain TOA measurement $t_3$.

In operation 1707 according to an exemplary embodiment, the responding device may transmit information about $[t_2-t_1]$, and the initiating device may receive the corresponding information and calculate an RTT based on Equation 4 below. The corresponding information may be transmitted and received by a separate signal or in the RTT measurement signal of operation 1705.

$$RTT = t_3 - t_0 - [t_2 - t_1]$$ [Equation 4]

Referring to FIG. 13(b), an RTT may correspond to a double-range measurement between two devices. Positioning estimation may be performed from the corresponding information, and multilateration may be used for the positioning estimation. $d_1$, $d_2$, and $d_3$ may be determined based on the measured RTT, and the location of a target device may be determined to be the intersection of the circumferences of circles with radiuses of $d_1$, $d_2$, and $d_3$, in which $BS_1$, $BS_2$, and $BS_3$ (or TRPs) are centered respectively.

3. Various Embodiments of the Present Disclosure

Various embodiments of the present disclosure will be described below in detail based on the above-described technical idea. Clause 1 and clause 2 may be applied to the various embodiments of the present disclosure. For example, operations, functions, and terms which are not defined in the various embodiments of the present disclosure may be performed and described based on clause 1 and clause 2.

Symbol/abbreviations/terms used in the following description of various embodiments of the present disclosure are described below.

AOA (AoA): angle of arrival
CSI-RS: channel state information reference signal
ECID: enhanced cell identifier
GPS: global positioning system
GNSS: global navigation satellite system
LMF: location management function
mod (modulo): a modulo arithmetic or modulo operation. For example, the modulo operation may be an operation of calculating the remainder r of dividing a dividend q by a divisor d (r=q mod (d)).
NRPPa: NR positioning protocol a
OTDOA (OTDoA): observed time difference of arrival
PRS: positioning reference signal
RAT: radio access technology
RS: reference signal
RTT: round trip time
RSRP: reference signal reception power
RSTD: reference signal time difference/relative signal time difference
SRS: sounding reference signal
SS: synchronization signal
SSB: synchronization signal block
SS/PBCH: synchronization signal/physical broadcast channel
TDOA (TDoA): timing difference of arrival
TOA (ToA): time of arrival
TRP: transmission reception point (TP: transmission point)
UTDOA (UTDoA): uplink time difference of arrival As more and more communication devices have required more traffic over time, the next-generation system, $5^{th}$ generation (5G) is required for wireless wideband communication advanced from the LTE system. This 5G system is called new RAT (NR), for convenience.

In the LTE system, when a location server configures a PRS, the location server may configure "PRS-info" as a cell/TP/BS-specific configuration parameter, so that a UE may obtain information about the bandwidth (BW) of a PRS transmitted from each cell/TP/BS, the transmission time of the PRS, a PRS muting pattern, and so on. For example, each piece of PRS-info may be configured with one PRS configuration identifier (ID) and/or PRS-ID.

In the LTE system, since one common beam is used for each cell/TP/BS, there is no need to configure multiple pieces of PRS-info having different PRS-IDs. However, considering that multiple narrow beams are selectively used and/or multiple narrow beams are used in a specific cell/TP/BS in the NR system, it may be necessary to configure PRSs in such a manner that a UE may distinguish PRSs transmitted through different analog beams.

In this regard, considering that a PRS is configured for a UE in the NR system by extending the LTE system, for example, a plurality of parameters such as a higher layer configuration parameter "PRS-info" may be configured for each cell/TP/BS. This may be considered to be the concept of PRS resources introduced in NR, and multiple PRS resources may be configured for each cell/TP/BS.

In the LTE system, PRS-info configured in each cell/TP/BS may have a unique PRS-ID and/or PRS sequence ID. On the other hand, in the NR system, each PRS resource may have a unique PRS ID and/or an independent PRS scrambling ID. One or more of these PRS resources may be configured as a group/set. In the LTE system, one common beam is considered and "PRS-INFO" having a specific PRS-ID is configured, whereas in the NR system, the concept that a PRS transmitted on a specific transmission (TX) beam from a specific cell/TP/BS has an independent PRS-ID has been introduced.

The following table is related to a PRS configuration described in 3GPP TS 36.355.

TABLE 6

```
-- ASN1START
PRS-Info ::= SEQUENCE {
    prs-Bandwidth              ENUMERATED { n6, n15, n25, n50, n75, n100, ... },
    prs-ConfigurationIndex     INTEGER (0..4095),
    numDL-Frames               ENUMERATED {sf-1, sf-2, sf-4, sf-6, ..., sf-add-
v1420},
    ...,
    prs-MutingInfo-r9          CHOICE {
        po2-r9                     BIT STRING (SIZE(2)),
        po4-r9                     BIT STRING (SIZE(4)),
        po8-r9                     BIT STRING (SIZE(8)),
        po16-r9                      BIT STRING (SIZE(16)),
        ...,
        po32-v1420                 BIT STRING (SIZE(32)),
        po64-v1420                 BIT STRING (SIZE(64)),
        po128-v1420                BIT STRING (SIZE(128)),
        po256-v1420                BIT STRING (SIZE(256)),
        po512-v1420                BIT STRING (SIZE(512)),
        po1024-v1420               BIT STRING (SIZE(1024))
    }
        OPTIONAL,                  -- Need OP
[[ prsID-r14                   INTEGER (0..4095)
```

TABLE 6-continued

```
        OPTIONAL,                    -- Need ON
    add-numDL-Frames-r14          INTEGER (1..160)      OPTIONAL,
        -- Con sf-add
    prsOccGroupLen-r14            ENUMERATED {g2, g4, g8, g16, g32, g64,
g128,... }
        OPTIONAL,                     -- Cond Occ-Grp
    prsHoppingInfo-r14 CHOICE {
        nb2-r14                    INTEGER           (0..
maxAvailNarrowBands-Minus1-r14),
        nb4-r14                    SEQUENCE (SIZE (3))
                                                OF INTEGER (0..
maxAvailNarrowBands-Minus1-r14)
    }
        OPTIONAL                     -- Cond PRS-FH
    ]]
}
maxAvailNarrowBands-Minus1-r14   INTEGER ::= 15   -- Maximum number of
narrowbands minus 1
-- ASN1STOP
```

TABLE 7

| Conditional presence | Explanation |
| --- | --- |
| sf-add | The field is mandatory present if the numDL-Frames field has the value 'sf-add'; otherwise it is not present. |
| Occ-Grp | The field is mandatory present if a PRS occasion group is configured; otherwise it is not present. |
| PRS-FH | The field is mandatory present if frequency hopping is used for PRS; otherwise it is not present. |

TABLE 8

PRS-Info field descriptions prs-Bandwidth
This field specifies the bandwidth that is used to configure the positioning reference signals on. Enumerated values are specified in number of resource blocks (n6 corresponds to 6 resource blocks, n15 to 15 resource blocks and so on) and define 1.4, 3, 5, 10, 15 and 20 MHz bandwidth.
prs-ConfigurationIndex
This field specfies the positioning reference signals configuration index $I_{PRS}$ as defined in TS 36.211 [16].

TABLE 9

PRS-Info field descriptions numDL-Frames
This field specifies the number of consecutive downlink subframes $N_{PRS}$ with positioning reference signals, as defined in TS 36.211 [16]. Enumerated values define 1, 2, 4, or 6 consecutive downlink subframes. The value sf-add indicates that $N_{PRS}$ is provided in the field add-numDL-Frames.
prs-MutingInfo
This field specifies the PRS muting configuration of the cell. The PRS muting configuration is defined by a periodic PRS muting sequence with periodicity $T_{REP}$ where $T_{REP}$, counted in the number of PRS occasion groups (TS 36.133 [18]), can be 2, 4, 8, 16, 32, 64, 128, 256, 512, or 1024 which is also the length of the selected bit string that represents this PRS muting sequence. If a bit in the PRS muting sequence is set to "0", then the PRS is muted in all the PRS occasions in the corresponding PRS occasion group. A PRS occasion group comprises one or more PRS occasions as indicated by prsOccGroupLen. Each PRS occasion comprises $N_{PRS}$ downlink positioning subframes as defined in TS 36.211 [16]. The first bit of the PRS muting sequence corresponds to the first PRS occasion group that starts after the beginning of the assistance data reference cell SFN = 0. The sequence is valid for all subframes after the target device has received the prs-MutingInfo. If this field is not present the target device may assume that the PRS muting is not in use for the cell.
When the SFN of the assistance data reference cell is not known to the UE and prs-MutingInfo is provided for a cell in the OTDOA-NeighbourCellInfoList IE, the UE may assume no PRS is transmitted by that cell.
When the UE receives a $T_{REP}$-bit muting pattern together with a PRS periodicity $T_{PRS}$ for the same cell which exceeds 10240 subframes (i.e., $T_{REP} \times T_{PRS} > 10240$ subframes), the UE shall assume an n-bit muting pattern based on the first n-bits, where n = $10240/T_{PRS}$.
prsID
This field specifies the PRS-ID as defined in TS 36.211 [16].
add-numDL-Frames
This field specifies the number of consecutive downlink subframes $N_{PRS}$ with positioning reference signals, as defined in TS 36.211 [16]. Integer values define 1, 2, 3, . . . , 160 consecutive downlink subframes.
prsOccGroupLen
This field specifies the PRS occasion group length, defined as the number of consecutive PRS occasions comprising a PRS occasion group. Each PRS occasion of the PRS occasion group consists of numDL-Frames or add-numDL-Frames consecutive downlink subframes with positioning reference signals. Enumerated values define 2, 4, 8, 16, 32, 64 or 128 consecutive PRS occasions. If omitted, the PRS occasion group length is 1. The product of the PRS periodicity T_PRS from the prs-ConfigurationIndex and the PRS occasion group length cannot exceed 1280.
prsHoppingInfo
This field specifies the PRS frequency hopping configuration (TS 36.211 [16]). The choice nb2 indicates hopping between 2 narrowbands; the choice nb4 indicates hopping between 4 narrowbands. The first PRS positioning occasion of the first PRS occasion group that starts after the beginning of SFN = 0 of the assistance data reference cell TABLE 9-continued PRS-Info field descriptions is located at the centre of the system bandwidth. The frequency band of each subsequent PRS occasion is indicated by nb2 or nb4, respectively, which defines the narrowband index $n_{NB}$ as specified in TS 36.211 [16]. If this field is absent, no PRS frequency hopping is used.

Referring to the above tables, a PRS muting pattern is a lower configuration parameter dependent on a configuration parameter "PRS-INFO". Each time a PRS is configured, a PRS muting pattern should be configured/indicated. However, instead of a single PRS configuration, multiple PRS resource configurations may be required for each cell/TP/BS because one or more analog beams are considered in the NR system, as described before. When a PRS muting pattern is configured whenever PRS resource(s) is configured, signaling overhead for the configuration may be unnecessarily increased.

For example, on the assumption that a 16-bit muting pattern used in the LTE system is configured for each PRS resource, 16-bit resources should be allocated for the PRS resource. When there are 10 PRS resources, 160 bits are required only for muting pattern configurations. The number of PRS resources may be significantly increased according to the TX beam management/operation of the cell/TP/B S. For example, a PRS may be transmitted on the same TX beam over multiple different PRS resources so that the UE may perform reception (RX) beam sweeping. Considering even the TX beam sweeping/refinement of the cell/TP/BS, it may be difficult to consider that the required number of PRS resources is small.

For the above-described reason, a PRS muting pattern needs to be configured independently of a PRS resource and/or a PRS resource set.

Figure 14:
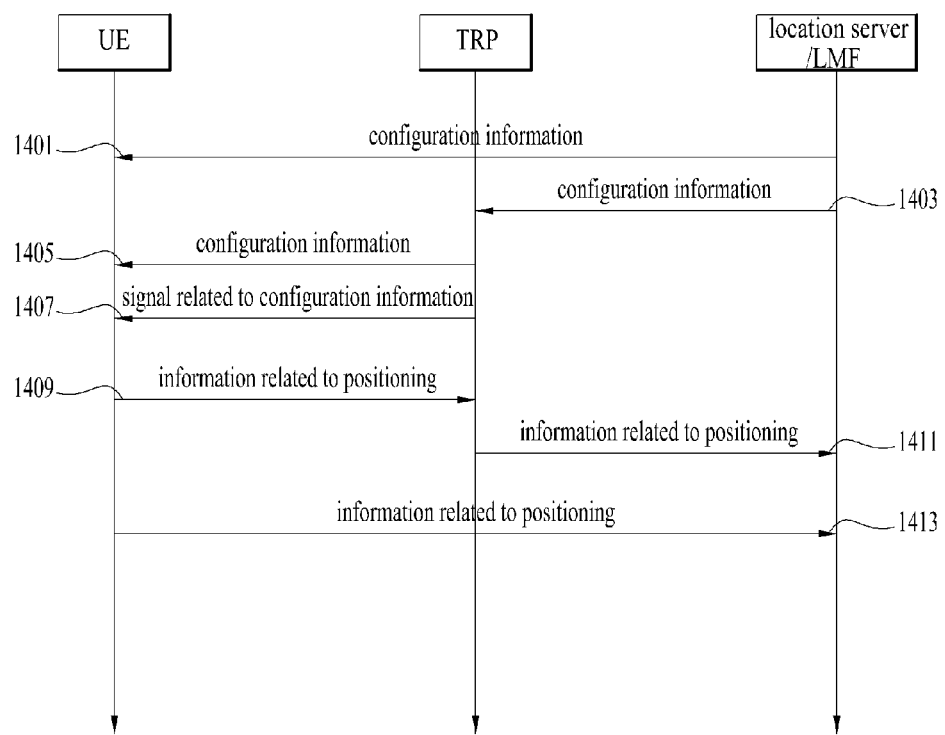
FIG. 14 is a simplified diagram illustrating a method of operating a UE, a transmission and reception point (TRP), a location server, and/or a location management function (LMF) according to various embodiments.

FIG. 14 is a simplified diagram illustrating a method of operating a UE, a transmission and reception point (TRP), a location server, and/or an LMF according to various embodiments of the present disclosure.

Referring to FIG. 14, in operation 1401 according to an exemplary embodiment, the location server and/or the LMF may transmit configuration information to the UE, and the UE may receive the configuration information.

In operation 1403 according to an exemplary embodiment, the location server and/or the LMF may transmit reference configuration information to a TRP, and the TRP may receive the reference configuration information. In operation 1405 according to an exemplary embodiment, the TRP may transmit the reference configuration information to the UE, and the UE may receive the reference configuration information. In this case, operation 1401 according to an exemplary embodiment may be omitted.

On the contrary, operations 1403 and 1405 according to an exemplary embodiment may be omitted. In this case, operation 1401 according to an exemplary embodiment may be performed.

That is, operation 1401 according to an exemplary embodiment, and operations 1403 and 1405 according to an exemplary embodiment may be optional.

In operation 1407 according to an exemplary embodiment, the TRP may transmit a signal related to the configuration information to the UE, and the UE may receive the signal related to the configuration information. For example, the signal related to the configuration information may be a signal for positioning the UE.

In operation 1409 according to an exemplary embodiment, the UE may transmit a positioning-related signal to the TRP, and the TRP may receive the positioning-related signal. In operation 2011 according to an exemplary embodiment, the TRP may transmit the positioning-related signal to the location server and/or the LMF, and the location server and/or the LMF may receive the positioning-related signal.

In operation 1413 according to an exemplary embodiment, the UE may transmit the positioning-related signal to the location server and/or the LMF, and the location server and/or the LMF may receive the positioning-related signal. In this case, operations 1409 and 1411 according to an exemplary embodiment may be omitted.

On the contrary, operation 1413 according to an exemplary embodiment may be omitted. In this case, operations 1411 and 1413 according to an exemplary embodiment may be performed.

That is, operations 1409 and 1411 according to an exemplary embodiment, and operation 1413 according to an exemplary embodiment may be optional.

In an exemplary embodiment, the positioning-related signal may be obtained based on the configuration information and/or the signal related to the configuration information.

Figure 15:
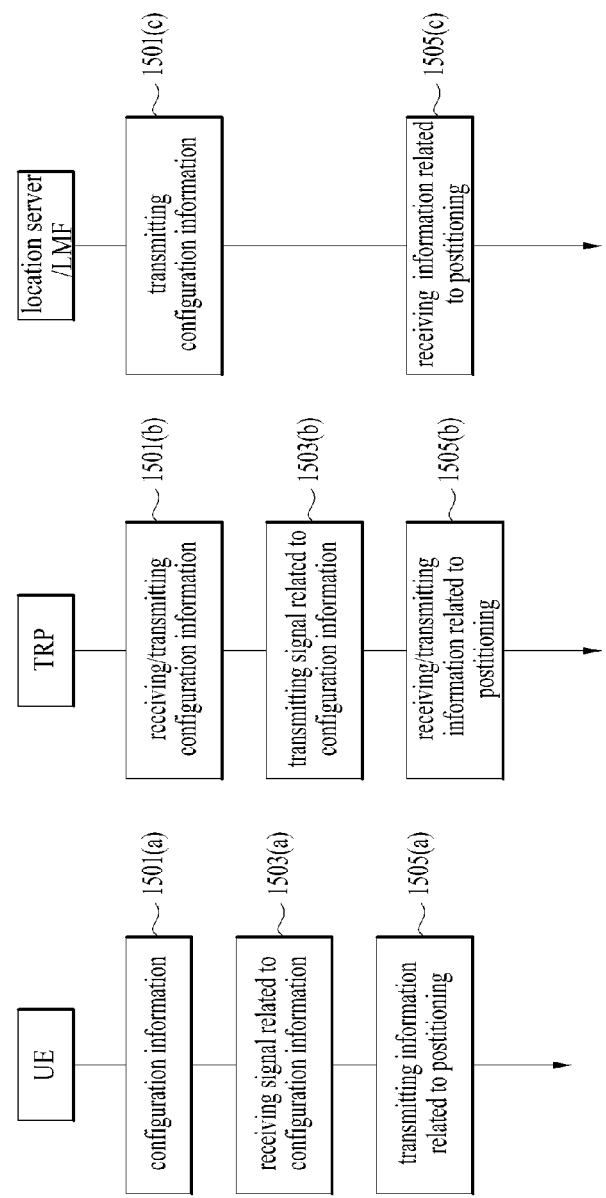
FIG. 15 is a simplified diagram illustrating a method of operating a UE, a TRP, a location server, and/or an LMF according to various embodiments.

FIG. 15 is a simplified diagram illustrating a method of operating a UE, a TRP, a location server, and/or an LMF according to various embodiments of the present disclosure.

Referring to FIG. 15(a), in operation 1501(a) according to an exemplary embodiment, the UE may receive configuration information.

In operation 1503(a) according to an exemplary embodiment, the UE may receive a signal related to the configuration information.

In operation 1505(a) according to an exemplary embodiment, the UE may transmit positioning-related information.

Referring to FIG. 15(b), in operation 1501(b) according to an exemplary embodiment, the TRP may receive configuration information from the location server and/or the LMF, and transmit the configuration information to the UE.

In operation 1503(b) according to an exemplary embodiment, the TRP may transmit a signal related to the configuration information.

In operation 1505(b) according to an exemplary embodiment, the TRP may receive positioning-related information and transmit the positioning-related information to the location server and/or the LMF.

Referring to FIG. 15(c), in operation 1501(c) according to an exemplary embodiment, the location server and/or the LMF may transmit configuration information.

In operation 1505(c) according to an exemplary embodiment, the location server and/or the LMF may receive positioning-related information.

For example, the above-described configuration information may be understood as related to reference configuration (information) or one or more pieces of information transmitted/configured to/for the UE by the location server and/or the LMF and/or the TRP, and/or as reference configuration (information) or one or more pieces of information transmitted/configured to/for the UE by the location server and/or the LMF and/or the TRP in the following description of various embodiments of the present disclosure.

For example, the above-described positioning-related signal may be understood as a signal related to one or more of pieces of information reported by the UE and/or as a signal including one or more of pieces of information reported by the UE in the following description of various embodiments of the present disclosure.

For example, a BS, a gNB, and a cell may be replaced by a TRP, a TP, or any equivalent device in the following description of various embodiments of the present disclosure.

For example, a location server may be replaced by an LMF or any equivalent device in the following description of various embodiments of the present disclosure.

More specific operations, functions, terms, and so on in the operation according to each exemplary embodiment may be performed and described based on various embodiments of the present disclosure to be described later. The operation according to each exemplary embodiment is exemplary, and one or more of the above-described operations may be omitted depending on the specific contents of each embodiment.

Various embodiments of the present disclosure will be described below in detail. It will be apparently understood to those skilled in the art that unless contradicting each other, the various embodiments of the present disclosure to be described below may be wholly or partially combined to constitute various other embodiments.

3.0. [Proposal #0] Independent Muting Configuration and Link to Resource/Resource Set According to various embodiments of the present disclosure, the LMF/location server may configure/indicate single or multiple muting pattern(s) for/to the UE/BS (independently of a PRS resource and/or PRS resource set configuration). For example, as each muting pattern is indicated with linkage to/in conjunction with one or more configured PRS resources and/or PRS resource sets, the muting pattern may be indicated as a zero-power transmission operation for each resource and/or resource set.

As a muting pattern is indicated/configured with linkage to/in conjunction with a PRS resource and/or a PRS resource set, PRS muting may be activated/deactivated for the PRS resource and/or the PRS resource set. For example, the muting pattern may be activated/deactivated more dynamically than the PRS resource and/or the PRS resource set is configured by the location server and/or the BS.

For example, multiple PRS muting patterns may be configured, and only the index of a specific PRS muting pattern (e.g., PRS muting pattern "A") may be configured with linkage to/in conjunction with a specific PRS resource and/or PRS resource set.

Therefore, unnecessary signaling overhead caused by configuring a muting pattern for every individual one of PRS resources and/or PRS resource sets to which the same muting pattern is applied may be reduced according to various embodiments of the present disclosure.

For example, a PRS resource and/or a PRS resource set may be configured/indicated independently of configuration/indication of a PRS muting pattern. For example, the LMF/location server may configure the UE/BS with a PRS resource and/or a PRS resource set together with information about a specific cell/TP/BS, and configure a PRS muting pattern separately for the UE. In this case, for example, since a specific PRS muting pattern may be more dynamically indicated with linkage to/in conjunction with a configured PRS resource and/or PRS resource set, a muting pattern may be more dynamically/adaptively changed/configured/indicated for a PRS resource and/or a PRS resource set configured with each cell/TP/BS. In this regard, the method of configuring/indicating a PRS muting pattern in proposal #0 may be required.

Figure 16:
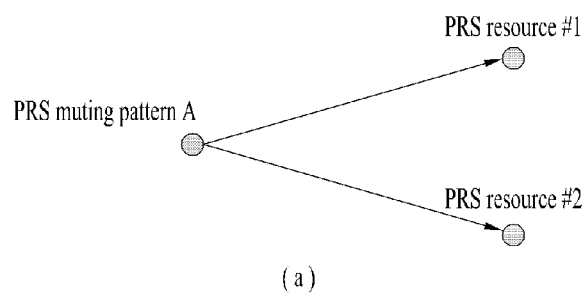
FIG. 16 is a diagram illustrating exemplary positioning reference signal (PRS) muting pattern configurations according to various embodiments of the present disclosure.
Figure 16:
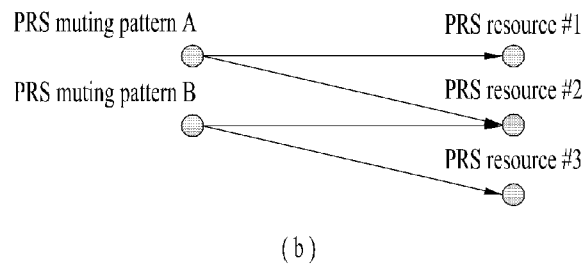
Figure 16:
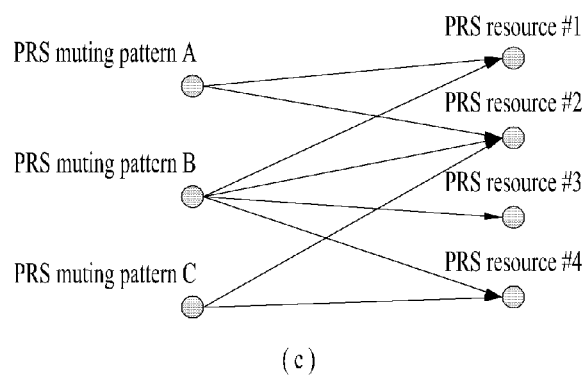

FIG. 16 is a diagram illustrating exemplary PRS muting patterns according to various embodiments of the present disclosure.

Referring to FIG. 16(a), for example, PRS resource #1 and PRS resource #2 may be configured, and PRS muting pattern A may be configured. For example, PRS muting pattern A may be linked/connected to PRS resource #1 and PRS resource #2. For example, PRS resource #1 and PRS resource #2 may be configured independently of PRS muting pattern A.

For example, as PRS muting pattern A is indicated, PRS resource #1 and PRS resource #2 may be activated/deactivated. For example, as PRS muting pattern A is indicated, PRS resource #1 and PRS resource #2 which are active may be deactivated. For example, as PRS muting pattern A is indicated, PRS resource #1 and PRS resource #2 which are inactive may be activated.

Referring to FIG. 16(b), for example, PRS resource #1, PRS resource #2, and PRS resource #3 may be configured, and PRS muting pattern A and PRS muting pattern B may be configured. For example, PRS muting pattern A may be linked/connected to PRS resource #1 and PRS resource #2. For example, PRS muting pattern B may be linked/connected to PRS resource #2 and PRS resource #3. For example, PRS resource #1, PRS resource #2, and PRS resource #3 may be configured independently of PRS muting pattern A and PRS muting pattern B.

For example, as PRS muting pattern A is indicated, PRS resource #1 and PRS resource #2 may be activated/deactivated. For example, as PRS muting pattern A is indicated, PRS resource #1 and PRS resource #2 which are active may be deactivated. For example, as PRS muting pattern A is indicated, PRS resource #1 and PRS resource #2 which are inactive may be activated. As PRS muting pattern B is indicated, PRS resource #2 and PRS resource #3 may be activated/deactivated. For example, as PRS muting pattern B is indicated, PRS resource #2 and PRS resource #3 which are active may be deactivated. For example, as PRS muting pattern A is indicated, PRS resource #2 and PRS resource #3 which are inactive may be activated.

Referring to FIG. 16(c), for example, PRS resource #1, PRS resource #2, PRS resource #3, and PRS resource #3 may be configured, and PRS muting pattern A, PRS muting pattern B, and PRS muting pattern C may be configured. For example, PRS muting pattern A may be linked/connected to PRS resource #1 and PRS resource #2. For example, PRS muting pattern B may be linked/connected to PRS resource #1, PRS resource #2, PRS resource #3, and PRS resource #4. For example, PRS muting pattern C may be linked/connected to PRS resource #2 and PRS resource #4. For example, PRS resource #1, PRS resource #2, PRS resource #3, and PRS resource #4 may be configured independently of PRS muting pattern A, PRS muting pattern B, and PRS muting pattern C.

For example, as PRS muting pattern A is indicated, PRS resource #1 and PRS resource #2 may be activated/deactivated. For example, as PRS muting pattern A is indicated, PRS resource #1 and PRS resource #2 which are active may be deactivated. For example, as PRS muting pattern A is indicated, PRS resource #1 and PRS resource #2 which are inactive may be activated. As PRS muting pattern B is indicated, PRS resource #1, PRS resource #2, PRS resource #3, and PRS resource #4 may be activated/deactivated. For example, as PRS muting pattern B is indicated, PRS resource #1, PRS resource #2, PRS resource #3, and PRS resource #4 which are active may be deactivated. For example, as PRS muting pattern B is indicated, PRS resource #1, PRS resource #2, PRS resource #3, and PRS resource #4 which are inactive may be activated. For example, as PRS muting pattern C is indicated, PRS resource #2 and PRS resource #4 may be activated/deactivated. For example, as PRS muting pattern C is indicated, PRS resource #2 and PRS resource #4 which are active may be deactivated. For example, as PRS muting pattern C is indicated, PRS resource #2 and PRS resource #4 which are inactive may be activated.

3.1. [Proposal #1] Multiple Muting Pattern Configuration for a PRS Resource within Different PRS Resource Sets For example, when different cells/TPs/BSs transmit the same PRS resource, it is important to introduce a PRS muting mechanism to enable a UE to successfully receive the same PRS resource from the different cells/TPs/BSs.

For example, transmission of the same PRS resource amounts to transmission of a PRS in the same frequency-time resource and/or with the same (PRS) sequence. Therefore, it may be more important to introduce a PRS muting mechanism, so that a cell/TP/BS relatively far (from the UE) and a cell/TP/BS relatively close (to the UE) may transmit PRSs at different time points.

In this context, according to various embodiments of the present disclosure, the LMF/location server and/or the BS may configure/indicate multiple PRS muting patterns for a specific PRS resource for/to the UE. Particularly, for example, the specific PRS resource may be configured/included in different PRS resource sets and transmitted from different cells/TPs/BSs. Therefore, for example, in the case where the LMF/location server/BS configures a PRS resource for the UE, when the LMF/location server/BS configures a PRS muting pattern for a specific PRS resource, the LMF/location server/BS may configure (the PRS muting pattern) for a specific PRS resource set including the specific PRS resource.

Figure 17:
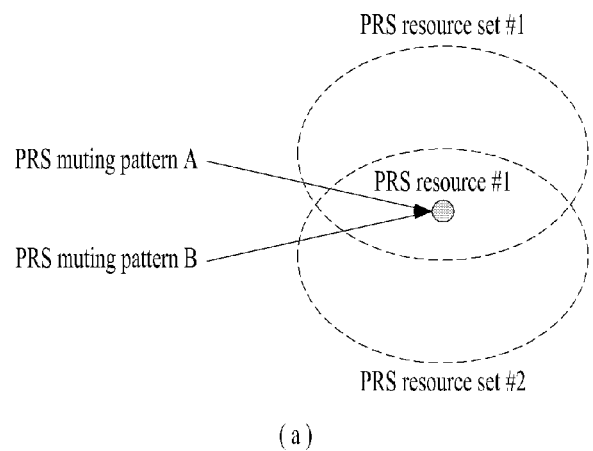
FIG. 17 is a diagram illustrating exemplary PRS muting pattern configurations according to various embodiments of the present disclosure.
Figure 17:
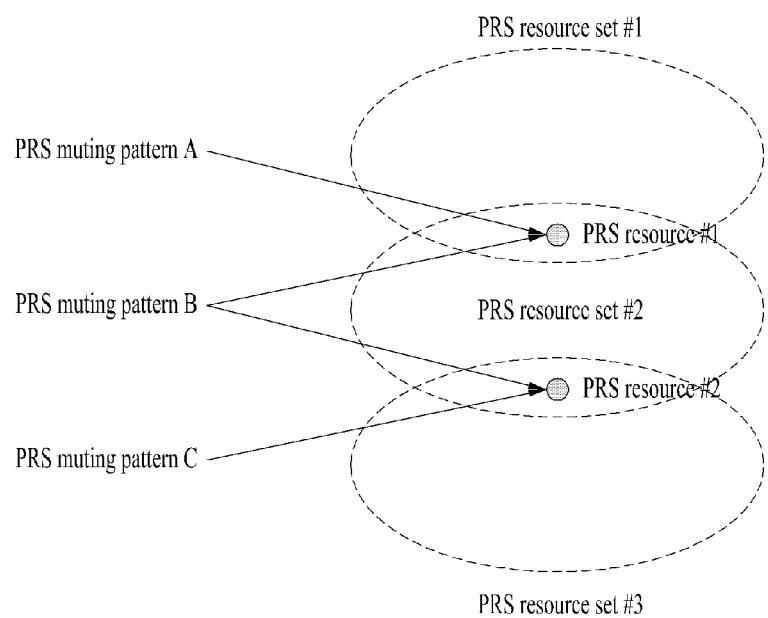

FIG. 17 is a diagram illustrating exemplary PRS muting patterns according to various embodiments of the present disclosure.

Referring to FIG. 17(a), for example, PRS resource #1, PRS resource set #1, and PRS resource set #2 may be configured, and PRS muting pattern A and PRS muting pattern B may be configured. For example, PRS resource #1 may be included in PRS resource set #1 and PRS resource set #2.

For example, PRS muting pattern A may be configured for PRS resource set #1 and/or PRS muting pattern A may be linked/connected to PRS resource set #1. For example, PRS muting pattern B may be configured for PRS resource set #2 and/or PRS muting pattern B may be linked/connected to PRS resource set #2.

Accordingly, for example, it may be said that PRS muting pattern A and PRS muting pattern B are configured for PRS resource #1 and/or PRS muting pattern A and PRS muting pattern B are linked/connected to PRS resource #1.

Referring to FIG. 17(b), for example, PRS resource #1, PRS resource #2, PRS resource set #1, PRS resource set #2, and PRS resource set #3 may be configured, and PRS muting pattern A, PRS muting pattern B, and PRS muting pattern C may be configured. For example, PRS resource #1 may be included in PRS resource set #1 and PRS resource set #2. For example, PRS resource #2 may be included in PRS resource set #2 and PRS resource set #3.

For example, PRS muting pattern A may be configured for PRS resource set #1 and/or PRS muting pattern A may be linked/connected to PRS resource set #1. For example, PRS muting pattern B may be configured for PRS resource set #2 and/or PRS muting pattern B may be linked/connected to PRS resource set #2. For example, PRS muting pattern C may be configured for PRS resource set #3 and/or PRS muting pattern C may be linked/connected to PRS resource set #3.

Accordingly, for example, it may be said that PRS muting pattern A and PRS muting pattern B are configured for PRS resource #1 and/or PRS muting pattern A and PRS muting pattern B are linked/connected to PRS resource #1. Further, for example, it may be said that PRS muting pattern B and PRS muting pattern C are configured for PRS resource #2 and/or PRS muting pattern B and PRS muting pattern C are linked/connected to PRS resource #2.

For example, a muting pattern for a specific PRS resource may be configured in conjunction with PRS resource set information (e.g., a PRS resource set index).

Further, for example, the LMF/location server/BS may configure/indicate a muting pattern independently/differently for each PRS resource. In an example of the configuration, one or more muting patterns may be configured at a specific PRS set level, and each muting pattern may be configured/indicated to be mapped/linked to a specific PRS resource.

For example, multiple PRS muting patterns may be predefined/preconfigured. For example, the LMF/location server may configure/instruct the BS to use a specific muting pattern dependently on PRS resource set information (e.g., an index for configuring a PRS resource set, and so on) and/or by a function of a PRS resource set index (e.g., the index for configuring the PRS resource set, and so on).

For example, multiple PRS muting patterns may be predefined/preconfigured from the perspective of the UE, and the LMF/location server may configure/instruct the UE to assume that a PRS resource is transmitted by using a specific muting pattern dependently on PRS resource set information (e.g., an index for configuring a PRS resource set, and so on) and/or by a function of the PRS resource set index (e.g., the index for configuring the PRS resource set, and so on).

For example, it is assumed that K (K is a natural number) muting patterns are predefined/preconfigured/pre-agreed, and one of the muting patterns is used for each TP and/or each PRS resource set. For example, the first to Kth muting patterns may be configured/indicated for each TP/PRS resource set according to a value obtained by a modulo operation between K and the PRS resource set ID of a PRS resource set including a specific PRS resource.

Figure 18:
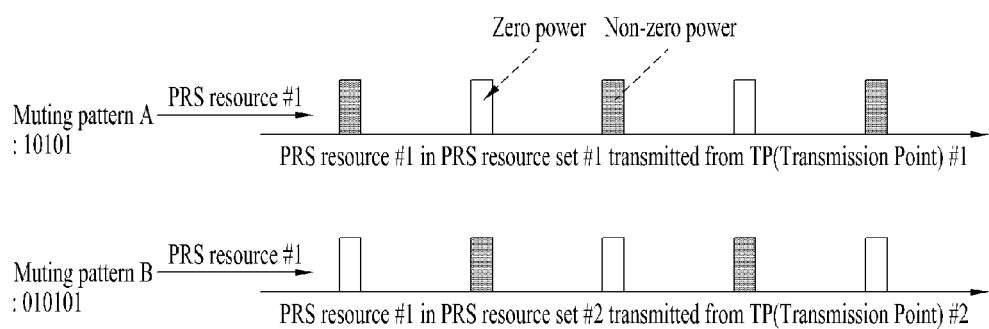
FIG. 18 is a diagram illustrating exemplary PRS muting pattern configurations according to various embodiments of the present disclosure.

FIG. 18 is a diagram illustrating exemplary PRS muting patterns according to various embodiments of the present disclosure.

Referring to FIG. 18, for example, a PRS muting pattern configuration related to different muting pattern configurations for the same PRS resource may be provided.

For example, it may be assumed that TP #1 and TP #2 transmit PRS resource set #1 and PRS resource set #2, respectively, and the same PRS resource, PRS resource #1 is included in both of the PRS resource sets. For example, because the same time-frequency resources are used, PRSs are transmitted in the same resources. Accordingly, each TP may use a different muting pattern.

For example, referring to FIG. 18, in this case, the LMF/location server/BS may configure muting pattern A for PRS resource #1 included in PRS resource set #1, and muting pattern B for PRS resource #1 included in PRS resource set #2.

For example, a muting pattern may be indicated by a bitmap. For example, a bit value of 1 (or 0) may indicate non-zero power, and a bit value of 0 (or 1) may indicate zero power.

For example, muting pattern A may be indicated as 10101, and muting pattern B may be indicated as 010101. For example, when muting pattern A, 10101 is indicated for PRS resource #1 included in PRS resource set #1, PRS resource #1 included in PRS resource set #1 may be transmitted with non-zero power at (first, third, and fifth) positions (transmission time points) corresponding to the bit value of 1, and with zero power at (second and fourth) positions corresponding to the bit value of 0.

For example, when muting pattern B, 010101 is indicated for PRS resource #1 included in PRS resource set #2, PRS resource #1 included in PRS resource set #2 may be transmitted with non-zero power at (second, fourth, and sixth) positions corresponding to the bit value of 1, and with zero power at (first, third, and fifth) positions corresponding to the bit value of 0.

3.1.1. [Proposal #1-1]

For example, a specific TP may need to transmit a PRS continuously on a specific TX beam, for RX beam sweeping/refinement of a UE that receives the PRS.

For this purpose, for example, the PRS may be transmitted on the same TX beam over multiple different PRS resources, and the LMF/location server/BS may configure the UE to recognize transmission of the PRS on the same TX beam over the multiple PRS resources.

For example, multiple PRS resources may be configured as one PRS resource set, and a CSI-RS resource set configuration parameter "repetition" (set to "On" or "Off") may be introduced as a PRS resource set configuration parameter. For example, when repetition="On", the UE may recognize/assume that the PRS resources of a PRS resource set are transmitted on the same TX beam. For example, when repetition="Off", the UE may recognize/assume that the PRS resources of the PRS resource set are not transmitted on the same TX beam.

For example, there may be a need for configuring muting of total PRSs transmitted on the same TX beam even in different PRS resources, considering this cell/TP/BS operation. That is, for example, the LMF/location server may configure zero power for all of specific periods/time points at which a PRS group and/or set including one or more PRS resources, and/or ma y also configure zero power for one or more specific PRS resources.

For example, the LMF/location server may configure one or multiple PRS muting patterns for the UE, configure a specific muting pattern with linkage to/in conjunction with a PRS resource set, and/or configure a specific muting pattern with linkage to/in conjunction with a specific PRS resource. For example, the LMF/location server/BS may adaptively this configuration in consideration of an inter-PRS interference environment and/or PRS detection performance 3.2. [Proposal #2] Partial Muting Configuration For example, the following two options may be supported for DL PRS muting.

Option 1: For example, the bits of a bitmap may correspond to a configurable number of consecutive instances (in a periodic transmission) of a DL PRS resource set. For example, all DL PRS resources in DL PRS resource set instances for which muting is indicated by the bitmap may be muted for the DL PRS resource set instances.

Option 2: For example, each bit of a bitmap may correspond to a single repetition index for each DL PRS resource set in DL PRS resource set instances. For example, the length of the bitmap may be equal to a repetition number of a DL PRS resource (e.g., DL-PRS-ResourceRepetitionFactor) in the DL PRS resource set. For example, the above description may be applied to all instances of all DL PRS resource sets to which a DL PRS resource belongs.

For example, a PRS muting pattern may need to be configured in consideration of different PRS resources, not only the same PRS resource transmitted by different cells/TPs/BSs. For example, because different PRS resources share a part of time-frequency resources, detection performance of the different PRS resources may not be guaranteed. In this case, for example, it may be necessary to mute a part of the PRS resources, not all of the PRS resources, for PRS muting.

According to various embodiments of the present disclosure, the LMF/location server/BS may configure/indicate zero power for some of frequency resource elements (REs) and/or time REs in which a specific PRS resource is transmitted at a specific time point/period in which the specific PRS is transmitted, for/to the UE.

For example, when a specific PRS resource occupies four OFDM symbols, the LMF/location server/BS may configure zero power for two of the OFDM symbols. In addition, for example, when a periodically/semi-persistently transmitted PRS resource is transmitted for a long time period (e.g., a time period having a duration equal to or larger than a specific threshold), the LMF/location server/BS may configure/indicate to the UE whether muting (zero power) is applied at a specific period/time point at which the PRS resource is transmitted. Herein, zero power may be configured/indicated only for some frequency REs and/or time REs of the PRS resource, rather than for all time-frequency REs occupied by the PRS resource at a time/period at which muting is applied.

In a specific example, it is assumed that a PRS muting pattern is configured based on 5 transmissions of one PRS resource. That is, for example, the configured PRS muting pattern may be applied repeatedly in each of 5 PRS resource transmission periods. For example, the PRS is periodically transmitted, and a muting pattern may be configured/indicated to indicate whether the PRS is transmitted or zero power is configured at each transmission time/period by a bitmap in consideration of a total of 5 transmissions of the PRS resource.

More specifically, the PRS muting pattern may be configured in 5 bits. For example, "1" (or "0") and "0" (or "1") in a bit string may indicate non-zero power for the PRS and zero power for the PRS, respectively. When the muting pattern is set as a bit string of "10101", the UE may recognize that the PRS resource is configured with zero power at second and fourth transmission time points.

Additionally, the LMF/location server/BS may configure/indicate for/to the UE that only some OFDM symbols of a PRS resource are configured with zero power (and/or muting) at a PRS transmission time at which the PRS resource is configured with zero power. For example, when the PRS includes three OFDM symbols, a 3-bit bitmap of "110" may be configured/indicated (for/to the UE by the LMF/location server/BS) so that zero power may be configured only for the last OFDM symbol, that is, the third OFDM symbol.

It may be concluded that for example, the LMF/location server/BS configures transmission time points at which zero power is transmitted (and/or PRS muting is performed) during a specific time period over which the PRS resource is transmitted to the UE (e.g., during multiple (a specific number of) transmissions of the PRS, when a PRS resource is periodically transmitted). Additionally, for example, the LMF/location server/BS may configure zero power (and/or PRS muting) only for some REs, not for all time-frequency REs of the PRS resource, at the time points at which zero-power (and/or PRS muting) is configured for the PRS resource.

For this purpose, for example, when the LMF/location server/BS configures a PRS muting pattern (and/or a zero-power PRS) for the UE, the LMF/location server/BS may configure/indicate two bitmaps for/to the UE. For example, one (a first bitmap) of the bitmaps may indicate transmission time points (and/or transmission periods) at which a PRS resource is transmitted with zero power in consideration of the transmission periodicity of the PRS resource. For example, the other bitmap (a second bitmap) may indicate/mean REs configured with zero power among time and/or frequency REs occupied by the PRS resource at the time points (and/or transmission periods) configured with zero power.

For example, when "$1^{st}$ bitmap: 10101, $2^{nd}$ bitmap: 110" is configured/indicated for/to the UE in the above example, the UE may identify from the $1^{st}$ bitmap that when the PRS resource is periodically transmitted, the PRS resource is transmitted with zero power in the second and fourth periods, and from the $2^{nd}$ bitmap that only the third OFDM symbol is configured with zero power at time points (the second and fourth periods) at which the PRS resource is transmitted with zero power.

For example, when the PRS is transmitted in a plurality of time periods (e.g., a plurality of instants), the length of the $1^{st}$ bitmap (e.g., the number of bits in the $1^{st}$ bitmap) may be equal to the number of the plurality of time periods.

For example, the length of the $2^{nd}$ bitmap (e.g., the number of bits in the $2^{nd}$ bitmap) may be equal to the number of REs (the number of OFDM symbols to which the PRS is mapped in the time domain or the number of REs to which the PRS is mapped in the frequency domain) in one or more (e.g., one or more time periods indicated as configured with zero power by the $1^{st}$ bitmap) of the plurality of time periods in which the PRS is transmitted.

Necessity of Proposal #2

Figure 19:
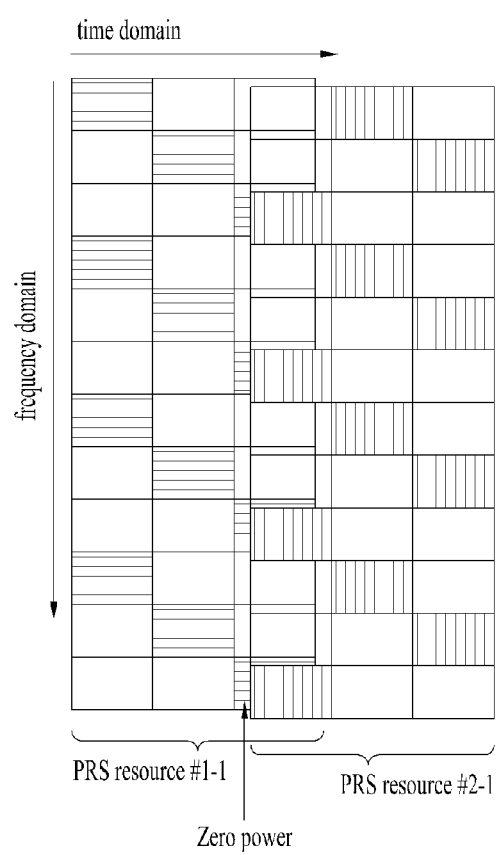
FIG. 19 is a diagram illustrating an exemplary PRS muting pattern configuration according to various embodiments of the present disclosure.

FIG. 19 is a diagram illustrating an exemplary PRS muting pattern configuration according to various embodiments of the present disclosure.

For example, although two PRS resources may not overlap with each other, at least some of the PRS resources may overlap with each other in a specific period/time point as in the example of FIG. 19.

For example, it may be assumed that TP #1 transmits a PRS resource included in PRS resource #1 configured as follows, and TP #2 transmits a PRS resource included in PRS resource #2.

PRS resource set #1={PRS resource #1-1, PRS resource #1-2, PRS resource #1-3}
PRS resource set #2={PRS resource #2-1, PRS resource #2-2, PRS resource #2-3}

In the above example, a PRS resource set may include different PRS resources.

For example, the PRS resources of each PRS resource set may be for different TX beam transmissions of each TP.

For example, although the time-frequency resources of each of the PRS resources of each PRS resource set may be configured/defined to be independently orthogonal, it may be difficult to always configure PRS resources to be orthogonal between different PRS resource sets in terms of efficient use of time-frequency resources.

Further, for example, when transmission timings between TPs are different even in the same PRS resource, PRS resources may overlap only in some OFDM symbols.

Therefore, for example, it may be necessary to configure muting for only some OFDM symbols and/or some frequency REs of a PRS resource. Therefore, for example, although PRS resource #1-1 and PRS resource #2-1 may not overlap with each other because they are transmitted in different periods, when the two PRS resources overlap with each other in a specific period/time as illustrated in FIG. 19, only the last symbol of PRS resource #1-1 (and/or the first symbol of PRS resource #2-1) may be configured with zero power in order to ensure reception of PRS resource #2-1 and partial reception of PRS resource #1-1 (and/or reception of PRS resource #1-1 and partial reception of PRS resource #2-1).

3.3. [Proposal #3] Decoding/Failure+Request of Additional Resource Allocation

For example, although the LMF/location server/BS may configure/indicate an appropriate PRS muting pattern for/to the UE, an appropriate PRS muting pattern may not be configured/indicated for/to the UE in view of the mobility of the UE.

Further, for example, it may occur that the UE fails in receiving a PRS from a specific cell/TP/BS depending on a channel environment between the UE and the specific cell/TP/BS.

To solve the above problems, the following various embodiments of the present disclosure may be considered.

For example, the UE may report that the UE is not capable of properly receiving the PRS from the specific cell/TP/BS to the LMF/location server/BS. For example, when the UE receives the PRS with a signal to noise ratio (SNR)/signal to interference plus noise ratio (SINR)/block error ratio (BLER) equal to or less than a specific threshold, which implies that the PRS is not properly received, the UE may declare PRS detection failure and report the PRS detection failure to the network. That is, for example, when the received PRS has an SNR/SINR/BLER equal to or less than one or more related thresholds, the UE may recognize/determine/identify that the UE has not received the PRS properly and/or has failed in detecting the PRS. (The same thing may be applied to this section and the description of various embodiments of the present disclosure.) In this case, for example, the UE may report PRS reception failure and/or PRS detection failure to the LMF/location server/B S.

More specifically, for example, the UE may report that it is not capable of properly receiving a specific PRS resource and/or PRS resource set to the LMF/location server/BS. Additionally, for example, the UE may report to the LMF/location server/BS that the specific PRS resource and/or PRS resource set that the UE has failed in properly receiving is a PRS transmitted from the specific cell/TP/BS.

For example, the UE may request a retransmission of the specific PRS resource and/or PRS resource set to the LMF/location server/BS. And/or, for example, the UE may request a higher resource allocation for the specific PRS resource and/or PRS resource set.

For example, the resource may be one or more of power, a frequency resource, a time resource, and a spatial resource.

3.4. [Proposal #4] On-Demand PRS Muting Request

According to various embodiments of the present disclosure, a method of requesting PRS muting (and/or zero power) by a UE may be provided. That is, according to various embodiments, a method of configuring PRS muting (and/or zero power) in response to a UE request may be provided.

3.4.1. BS Level

For example, the UE may request the LMF/location server/BS to configure muting for a PRS (a zero-power PRS) transmitted from a specific gNB/BS.

For example, the UE may be (relatively) close to BS #1 and far from BS #2. In this case, when the two BSs transmit PRSs in time-frequency resources which are fully and/or partially identical, the UE may not properly receive a PRS from a specific BS.

In this situation, for example, the UE may need to request muting for the PRS transmitted from the specific BS. That is, for example, the UE may request muting for the PRS transmitted from BS #1 or BS #2 to the LMF/location server/BS. For example, when the PRS transmitted from BS #1 or BS #2 is muted in response to the request, the UE may properly receive the PRS from BS #2 or BS #1.

3.4.2. TP/TRP Level

For example, the UE may request the LMF/location server/BS to configure muting for a PRS (a zero-power PRS) transmitted from a specific TP/TRP.

For example, in the case where there are multiple TPs/TRPs such as remote radio heads (RRHs) in one cell as in a distributed antenna system (DAS), when all and/or some of the multiple TPs/TRPs transmit PRSs by sharing the same time-frequency resource, a PRS transmitted from a relatively close TP/TRP (to the UE) may have a greater signal strength than a PRS transmitted from a relatively far TP/TRP, and thus the UE may fail in receiving the PRS from the relatively far TP/TRP.

In this situation, for example, the UE may need to request muting for a PRS transmitted from a specific TP/TRP. That is, for example, the UE may request muting for a PRS transmitted from the relatively close (and/or the relatively far) TP/TRP among the multiple TPs/TRPs to the LMF/location server/BS. For example, when the PRS transmitted from the relatively close (and/or the relatively far) TP/TRP is muted in response to the request, the UE may properly receive the PRS from the relatively far (and/or the relatively close) TP/TRP.

3.4.3. PRS Resource Level and/or PRS Resource Set Level

For example, the UE may request the LMF/location server/BS to configure muting (a zero-power PRS) for a specific PRS resource and/or PRS resource set. And/or, for example, the UE may request the LMF/location server/BS to configure muting (a zero-power PRS) for a PRS resource and/or PRS resource set transmitted from a specific TP/TRP/gNB/B S.

For example, a request for configuring muting (a zero-power PRS) for a specific PRS resource transmitted from a TP may be interpreted as a request for configuring muting (zero power) for a specific TX beam on which the TP transmits the PRS.

For example, the specific PRS resource may be regarded as a PRS transmitted on a specific analog beam of the TP. For example, when the PRS is transmitted on different TX beams, the TP may transmit the PRS in different PRS resources, and the UE may identify/recognize TX beam information about the PRS resources transmitted from the TP from PRS resource IDs and/or scrambling IDs configured/assigned for/to the respective PRS resources.

However, for example, one or more PRS resources may be configured in a specific PRS resource set, and the configured PRS resources may be transmitted on the same TX beam. However, for example, there may be a need to notify the UE of use of the same TX beam in the different PRS resources by specific signaling/configuration. For example, a muting configuration request for a specific PRS resource set may be a muting configuration request for multiple beam directions in which the specific TP transmits the PRS. And/or it may be a muting configuration request for one PRS resource set of multiple PRS resources configured to be transmitted on the same TX beam.

For example, while the UE receives a PRS configuration from the LMF/location server, the UE may directly request a PRS muting (and/or zero-power) configuration request to the cellular BS. For example, the BS may configure/indicate a zero-power PRS for/to the UE in response to the request of the UE without signaling with the LMF/location server.

Figure 20:
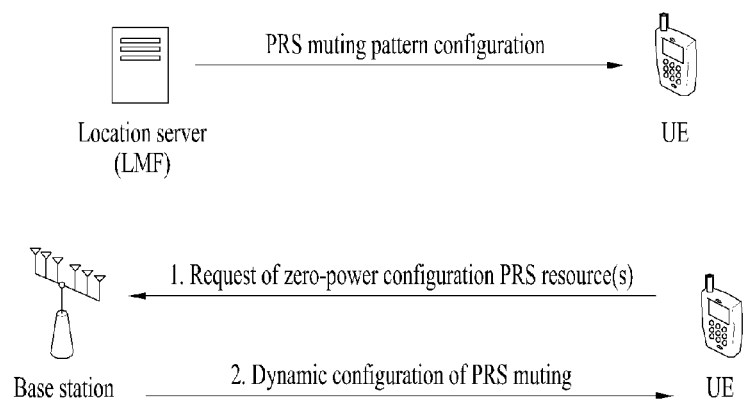
FIG. 20 is a diagram illustrating an exemplary PRS muting configuration request according to various embodiments of the present disclosure.

FIG. 20 is a diagram illustrating an exemplary PRS muting configuration request according to various embodiments of the present disclosure.

More specifically, FIG. 20 is a diagram illustrating an example of an on-demand PRS muting configuration and a dynamic configuration of PRS muting from a BS according to various embodiments of the present disclosure.

Referring to FIG. 20, the UE may receive a PRS muting pattern configuration from the LMF/location server. For example, the UE may request a zero-power configuration for a PRS resource to the BS. For example, the BS may provide a dynamic configuration of PRS muting to the UE in response to the request.

That is, for example, the UE may initially receive a muting pattern configuration from the LMF/location server. However, for example, when the UE requests muting in an on-demand manner, the UE directly receives a PRS muting (and/or zero-power) configuration from the BS, instead of the LMF/location server.

For example, for the PRS muting (and/or zero-power PRS) requested by the UE, the BS may indicate/configure information about a specific PRS resource and/or PRS resource set to/for the UE by RRC and/or medium access control-control element (MAC-CE) and/or DCI signaling. For example, it may be necessary to indicate to the UE that the PRS resource and/or PRS resource set is muted, dynamically by MAC-CE/DCI signaling as well as RRC signaling.

In another example, the LMF/location server may configure regular PRS muting that takes place over a (relatively) long term in consideration of multiple cells/TPs/BSs for the UE, whereas the cellular BS may configure zero power for a PRS over a (relatively) temporary/short term for the UE.

Necessity

For example, when the LMF/location server has already configured a PRS muting pattern for the UE and the UE has failed in securing a measurement of a specific PRS resource and/or PRS resource set with an accuracy equal to or greater than a certain level (e.g., a specified threshold), the UE may receive another PRS resource and/or PRS resource set with zero power at one shot and/or over a short term to obtain an accurate measurement of the PRS resource and/or PRS resource set. To this end, for example, the UE may request PRS muting to the BS, and the BS may configure/indicate some PRS resource and/or PRS resource set with zero-power only for a specific time for/to the UE.

For example, based on the UE requesting muting (zero power) for a specific PRS resource and/or PRS resource set, the BS (and/or the LMF/location server) may configure/indicate transmission of a zero-power (muted) specific PRS resource and/or PRS resource set for a specific/certain time period for/to the UE.

For example, zero-power may be temporarily configured/indicated for the PRS resource and/or PRS resource set only at a closest transmission time of the PRS resource and/or PRS resource set from the time point at which the UE requested PRS muting for the specific PRS resource and/or PRS resource set.

And/or, for example, the UE may request PRS muting for a PRS resource and/or PRS resource set and perform a PRS measurement, assuming that the cell/TP/BS will transmit the PRS resource and/or PRS resource set at a time closest to the time of the request.

In another example, the BS may indicate to the UE that the PRS resource and/or the PRS resource set is transmitted with zero power only in a specific PRS occasion in which the PRS resource and/or PRS resource set is transmitted. (That is, the BS may configure/indicate this for/to the UE.)

And/or, for example, a time period during which a specific PRS resource is transmitted with zero power may be configured/indicated. For this purpose, for example, a starting time and an ending time may be configured/indicated. For example, the start and end of the time period during which the specific PRS resource is transmitted with zero power may be configured/indicated.

And/or, for example, the number of times a periodic/semi-persistent PRS is transmitted with zero power based on a current time may be configured/indicated for/to the UE.

Temporary PRS Muting Configuration

For example, temporary and dynamic PRS muting may be configured/indicated independently of a periodic and/or persistent PRS muting configuration. For example, instead of the LMF/location server, the BS may directly configure/indicate the temporary PRS muting for/to the UE by RRC/MAC-CE/DCI signaling.

3.5. Detail of PRS Muting Configuration

According to various embodiments of the present disclosure, a specific method of configuring PRS muting may be provided. For example, the following methods may be provided based on a bitmap method and a modulo method.

1) For example, as described in proposal #1, the bitmap method may first be considered. For example, time points/periods in which a periodic/semi-static PRS resource is transmitted with zero power among transmission time points/periods of the PRS resource may be indicated by a bitmap. For example, referring back to FIG. 18, two bitmaps may be configured. For example, one (a first bit-map) of the bitmaps may indicate periods/time points in which the periodic/semi-static specific PRS resource is configured with zero power. For example, the other bitmap (a second bitmap) may indicate REs configured zero power among time-frequency REs occupied by the PRS resource at a transmission period/time point configured with zero power. For example, the second bitmap may be a bitmap indicating OFDM symbols in which the PRS resource is configured with zero power among a plurality of OFDM symbols occupied by the PRS resource.

2) For example, despite the benefit that the LMF/location server/BS may configure PRS muting relatively freely and flexibly, the bitmap method may have large signaling overhead depending on a muting pattern periodicity. Alternatively, PRS muting may be configured by using, for example, a modulo operation. For example, when a specific PRS resource is configured/defined only in one slot, slot offset=0, and a periodicity is 10 slots, the PRS resource may be configured with zero power in slots with slot indexes divided by 50 with a remainder of 0. For example, to configure a time slot in which muting is applied to a PRS resource, the following equation may be considered.

$$f(\text{slot index}, \text{slot offset}) \bmod X \qquad [\text{Equation}]$$

For example, f(slot index, slot offset) may represent a specific constant determined by a function of a slot index and/or a slot offset. X may represent an integer and/or natural number greater than 0.

3) For example, use of both of the bit-map method and the modulo method may be considered to configure PRS muting. For example, the above-described modulo method for PRS muting indicates a period/time in which a specific periodic/semi-static PRS resource is configured with zero power, and the bitmap method for PRS muting may be additionally introduced to indicate REs configured with zero power among time-frequency REs used by a PRS at the period/time point in which the PRS resource is configured with zero power.

3.6. [Proposal #6] Reception of Same PRS Resource

For example, the location server may indicate a PRS muting pattern that the wireless network BS configures for the UE, for PRS transmission, to the BS by a protocol/channel/container such as LTE positioning protocol a/LPP (LPPa), and the LMF/location server may expect that when a PRS is transmitted, the cell/TP/BS will operate according to the PRS muting pattern indicated to the BS.

However, for example, since the BS may not follow the request/indication/configuration of the location server, the BS may transmit the PRS without complying with the provided muting pattern. For example, when different PRS resources are transmitted in all and/or some frequency resources at the same time point, there may be no big problem in distinguishing the PRS resources by different sequences of the PRS resources. However, when the same PRS resource is simultaneously transmitted from different TPs, it may be difficult for the UE to identify a TP from which a PRS is transmitted because the same sequence is used.

In this regard, according to various embodiments of the present disclosure, the following operations of a UE and/or a network (LMF/location server/BS) may be provided.

For example, when different TPs transmit the same PRS resource, that is, when appropriate PRS muting is not configured/indicated for a specific PRS resource so that the specific PRS resource may be transmitted from a specific TP, the UE may ignore a propagation time/time of arrival (TOA)/time of flight (TOF) measurement of the PRS resource.

For example, because a propagation time measurement obtained from the PRS resource transmitted from the multiple TPs is highly probable to be a propagation time measurement of the PRS resource transmitted from a nearest TP (to the UE among the multiple TPs), it may be difficult to consider the measurement to be a measurement for each of the different TPs.

Alternatively, for example, in the case where the same PRS resource is transmitted from different TPs, when the UE obtains a propagation time/TOA/TOF measurement from the PRS resource and reports the measurement to the LMF/location server/BS (this operation may include calculating/reporting an RSTD by using the propagation time measurement), the UE may indicate to the LMF/location server/BS that the measurement is a measurement of the same PRS resource transmitted from the multiple TPs and is reported based on measurement information about the PRS resource transmitted from a TP closest (to the UE among the multiple TPs).

Alternatively, for example, when the same PRS resource is transmitted from different TPs and/or in different PRS resource sets, the LMF/location server/BS may configure use of different sequences to enable the TPs and/or the PRS resource sets to be distinguished, even though the same PRS resource is transmitted. For example, when the sequence initialization of the PRS resource is performed, different sequences may be used even for the same PRS resource by using TP IDs and/or IDs at the PRS resource set level (e.g., scrambling IDs at the PRS resource set level) as well as scrambling IDs for the PRS resource.

On the other hand, for example, the network (LMF/location server/BS) may intentionally instruct different TPs to transmit the same PRS resource. For example, a specific PRS resource may be transmitted from a group of TP(s), and the UE may determine a (cross-)correlation timing window for use in receiving a PRS resource later from the TP group based on the TOA/propagation measurement of the PRS resource. This may, for example, have the advantage of reducing the implementation complexity of the UE in receiving the PRS resource transmitted later.

In this context, according to various embodiments of the present disclosure, the following operations of a UE and/or a network (LMF/location server/BS) may be considered.

For example, the same PRS resource may be included in different PRS resource sets configured in conjunction with different cells/TPs/BSs. For example, PRS resources included in the different PRS resource sets may be configured to be transmitted together at a specific time/period. For example, PRS muting may not be configured so that a specific PRS resource included in the different PRS resource sets may be transmitted at the same time point, and/or even though PRS muting is configured, the LMF/location server may intentionally configure simultaneous transmission of the specific PRS resource at a specific time/period.

For example, in the case where the same PRS resource is configured to be transmitted from different TPs, when the UE obtains a TOA/propagation time measurement from the PRS resource, the LMF/location server/BS may configure/instruct the UE to obtain a propagation time measurement of a representative arrival path, not the first arrival path, considering that the PRS resource is transmitted from the multiple cells/TPs/BSs. For example, the UE may obtain an average of the propagation times of multiple paths and report the average propagation time to the LMF/location server/BS. For example, the reception complexity of the UE may be reduced by adjusting/re-adjusting a correlation timing window for PRS reception based on the average propagation time.

Figure 21:
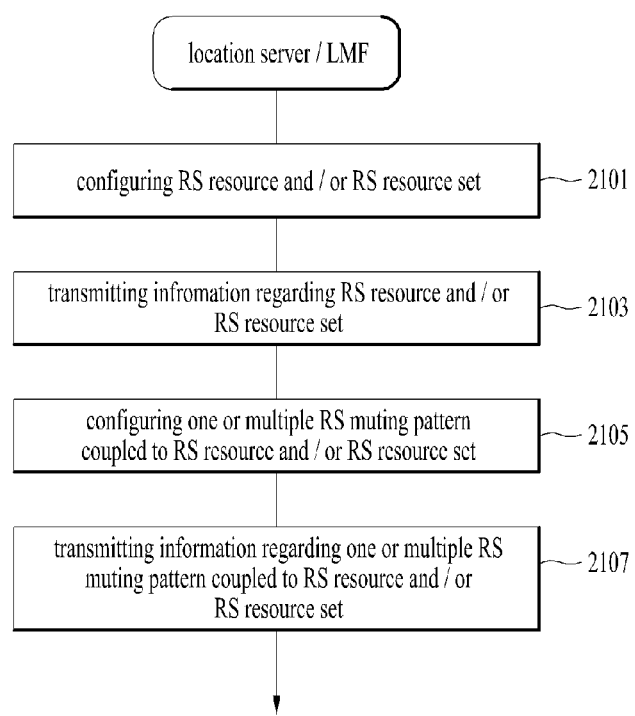
FIG. 21 is a flowchart illustrating a method of operating a location server/location management function (LMF) according to various embodiments of the present disclosure.

FIG. 21 is a flowchart illustrating a method of operating a location server/LMF according to various embodiments of the present disclosure.

Referring to FIG. 21, in operation 2101 according to an exemplary embodiment, the location server/LMF may configure an RS resource and/or RS resource set.

For example, the location server/LMF may configure an RS resource and/or RS resource set to be used for UE positioning, for a UE. For example, the location server/LMF may configure the RS resource and/or RS resource set as assistance data (e.g., assistance data defined in TS 36.355) for OTDOA for the UE. For example, an RS may be a PRS.

In operation 2103 according to an exemplary embodiment, the location server/LMF may transmit information about the RS resource and/or RS resource set.

For example, the location server/LMF may transmit the information about the RS resource and/or RS resource set to be used for UE positioning to a BS/TP. For example, the location server/LMF may transmit the information about the RS resource and/or RS resource set to the BS/TP by LPPa and/or NRPPa.

In operation 2105 according to an exemplary embodiment, the location server/LMF may configure one or multiple RS muting patterns in conjunction with/with linkage to the RS resource and/or RS resource set.

For example, the location server/LMF may configure one or multiple PRS muting patterns for the UE in conjunction with/with linkage to a PRS resource and/or PRS resource set. For example, the location server/LMF may configure the one or multiple PRS muting patterns as assistance data (e.g., assistance data defined in TS 36.355) for OTDOA for the UE in conjunction with/with linkage to the PRS resource and/or PRS resource set.

In operation 2107 according to an exemplary embodiment, the location server/LMF may transmit information for configuring the one or multiple RS muting patterns with linkage to/in conjunction with the RS resource and/or RS resource set.

For example, the location server/LMF may transmit information for configuring one or multiple PRS muting patterns with linkage to/in conjunction with a PRS resource and/or PRS resource set. For example, the location server/LMF may transmit the information for configuring the one or multiple PRS muting patterns with linkage to/in conjunction with the PRS resource and/or PRS resource set to the BS/TP by LPPa and/or NRPPa.

Figure 22:
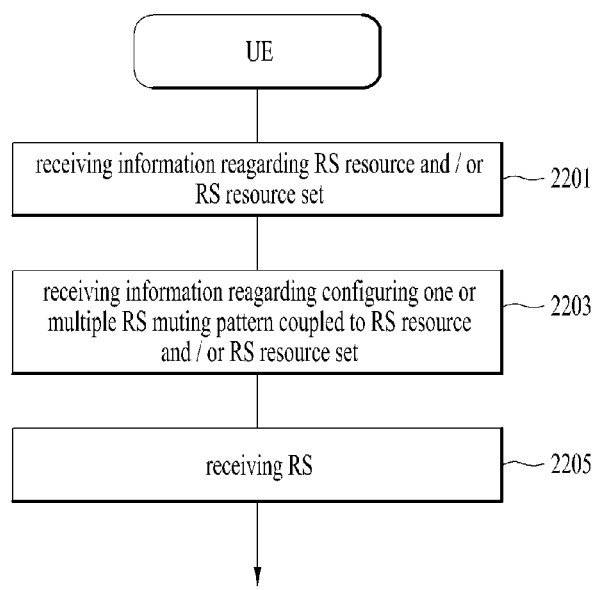
FIG. 22 is a flowchart illustrating a method of operating a user equipment (UE) according to various embodiments of the present disclosure.

FIG. 22 is a flowchart illustrating a method of operating a UE according to various embodiments of the present disclosure.

Referring to FIG. 22, in operation 2201 according to an exemplary embodiment, the UE may receive information about an RS resource and/or RS resource set.

For example, the UE may receive information about an RS resource and/or RS resource set to be used for UE positioning from the location server/LMF. For example, the UE may receive the information about the RS resource and/or RS resource set as assistance data (e.g., assistance data defined in TS 36.355) for OTDOA from the location server/LMF. For example, an RS may be a PRS.

In operation 2203 according to an exemplary embodiment, the UE may receive information for configuring one or multiple RS muting patterns in conjunction with/with linkage to the RS resource and/or RS resource set.

For example, the UE may receive information for configuring one or multiple PRS muting patterns in conjunction with/with linkage to a PRS resource and/or PRS resource set from the location server/LMF. For example, the UE may receive the information for configuring the one or multiple PRS muting patterns in conjunction with/with linkage to the PRS resource and/or PRS resource set as a part of assistance data (e.g., assistance data defined in TS 36.355) for OTDOA from the location server/LMF.

In operation 2205 according to an exemplary embodiment, the UE may receive an RS. For example, the UE may receive a PRS from the cell/TP/BS.

Figure 23:
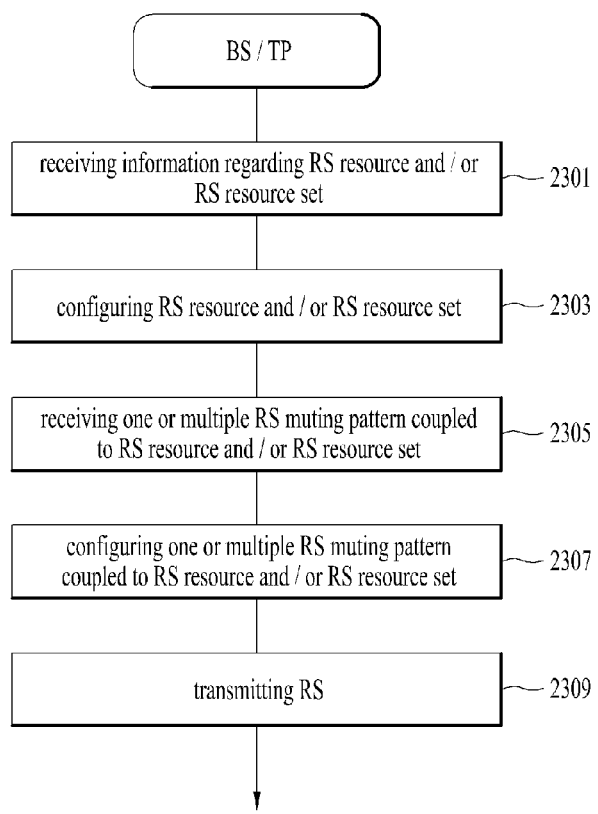
FIG. 23 is a flowchart illustrating a method of operating a base station (BS)/transmission point (TP) according to various embodiments of the present disclosure.

FIG. 23 is a flowchart illustrating a method of operating a BS/TP according to various embodiments of the present disclosure.

Referring to FIG. 23, in operation 2301 according to an exemplary embodiment, the BS/TP may receive information about an RS resource and/or RS resource set.

For example, the BS/TP may receive information about an RS resource and/or RS resource set to be used for UE positioning from the location server/LMF. For example, the BS/TP may receive the information about the RS resource and/or RS resource set from the location server/LMF by LPPa or NRPPa. For example, an RS may be a PRS.

In operation 2303 according to an exemplary embodiment, the BS/TP may configure the RS resource and/or RS resource set.

For example, the BS/TP may transmit information for configuring the RS resource and/or RS resource set to the UE.

In operation 2305 according to an exemplary embodiment, the BS/TP may receive information for configuring one or multiple PRS muting patterns with linkage to/in conjunction with a PRS resource and/or PRS resource set from the location server/LMF. For example, the BS/TP may receive the information for configuring the one or multiple PRS muting patterns with linkage to/in conjunction with the PRS resource and/or PRS resource set from the location server/LMF by LPPa and/or NRPPa.

In operation 2307 according to an exemplary embodiment, the BS/TP may configure the one or multiple RS muting patterns in conjunction with/with linkage to the PRS resource and/or PRS resource set.

For example, the BS/LMF may transmit information for configuring the one or multiple PRS muting patterns with linkage to/in conjunction with the PRS resource and/or PRS resource set to the UE.

In FIGS. 21 to 23, operations according to exemplary embodiments may be performed simultaneously or independently. Further, the order of operations according to an exemplary embodiment is not limited to the illustrated order, and some or all of the operations may be performed in a different order. Further, at least some of the operations according to each embodiment may be omitted.

For example, when the location server/LMF performs operations 2101 and 2103 according to the exemplary embodiment of FIG. 21, the BS/TP may skip operations 2302 and 2304 according to the exemplary embodiment of FIG. 23. On the contrary, when the BS/TP performs operations 2302 and 2304 according to the exemplary embodiment of FIG. 23, the location server/LMF may skip operations 2101 and 2103 according to the exemplary embodiment of FIG. 21.

According to various embodiments of the present disclosure, the UE may receive, from the BS/TP and/or the location server/LMF, information about an RS resource and/or RS resource set, and/or one or more pieces of RS muting information, which are to be used for positioning.

For example, in operations 2201 and 2202 according to the exemplary embodiment of FIG. 22, the UE may receive and/or be configured with the information about the RS resource and/or RS resource set, and/or the one or more pieces of RS muting information, which are to be used for positioning from the location server/LMF.

Alternatively, for example, in operations 2201 and 2202 according to the exemplary embodiment of FIG. 22, the UE may receive and/or be configured with the information about the RS resource and/or RS resource set, and/or the one or more pieces of RS muting information, which are to be used for positioning, from the BS/TP.

Examples of the above-described proposed methods may also be included as one of various embodiments of the present disclosure, and thus may be considered to be some proposed methods. While the proposed methods may be independently implemented, some of the proposed methods may be combined (or merged). It may be regulated that information indicating whether to apply the proposed methods (or information about the rules of the proposed methods) is indicated by a signal (e.g., a physical-layer signal or a higher-layer signal) predefined for the UE by the BS.

Figure 24:
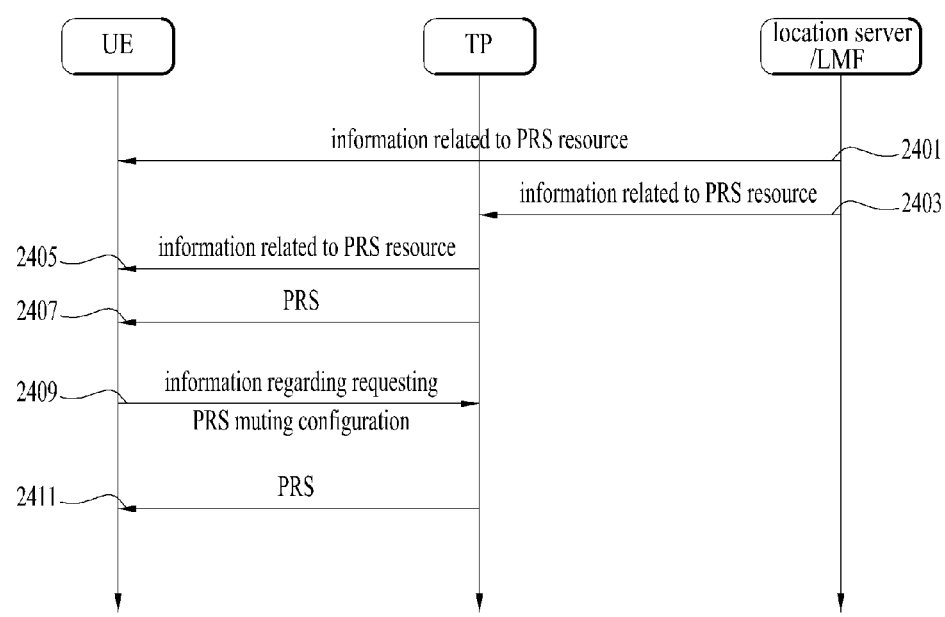
FIG. 24 is a simplified diagram illustrating a method of operating a UE and network nodes according to various embodiments of the present disclosure.

FIG. 24 is a simplified diagram illustrating a method of operating a UE and network nodes according to various embodiments of the present disclosure.

Figure 25:
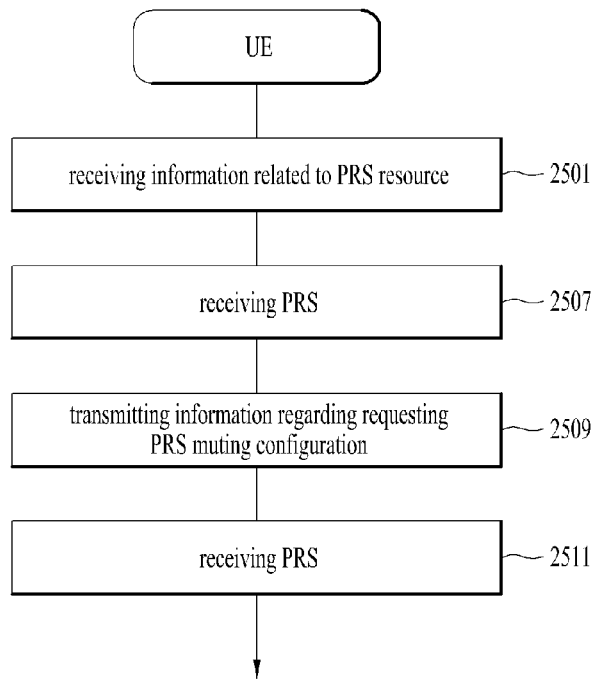
FIG. 25 is a flowchart illustrating a method of operating a UE according to various embodiments of the present disclosure.

FIG. 25 is a flowchart illustrating a method of operating a UE according to various embodiments of the present disclosure.

Figure 26:
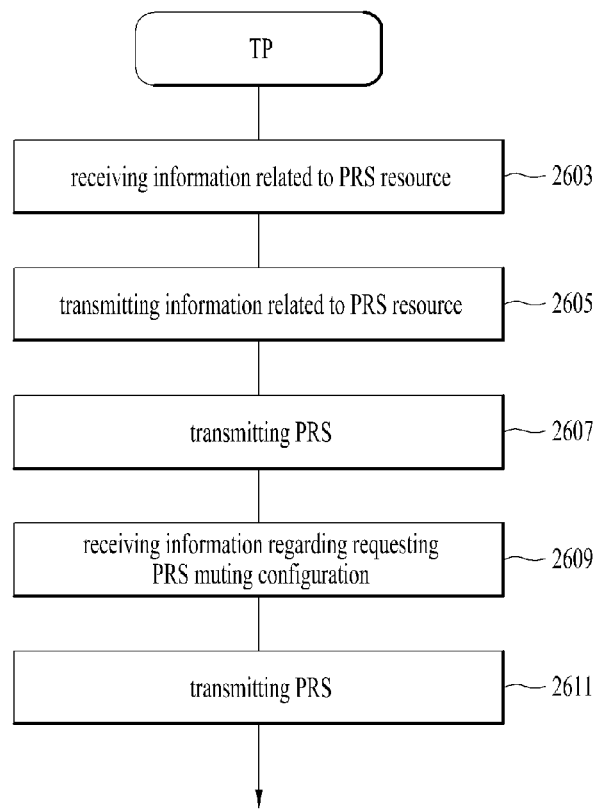
FIG. 26 is a flowchart illustrating a method of operating a TP according to various embodiments of the present disclosure.

FIG. 26 is a flowchart illustrating a method of operating a TP according to various embodiments of the present disclosure.

Referring to FIGS. 24 to 26, in operations 2401 and 2501 according to an exemplary embodiment, a location server/LMF may transmit information related to a PRS resource, and a UE may receive the information related to the PRS resource.

In operations 2403 and 2603 according to an exemplary embodiment, the location server/LMF may transmit the information related to the PRS resource, and the TP may receive the information related to the PRS resource. In operations 2405, 2501, and 2605 according to an exemplary embodiment, the BS may transmit the information related to the PRS resource, and the UE may receive the information related to the PRS resource. In this case, operation 2401 according to an exemplary embodiment may be omitted.

On the contrary, operations 2403, 2603, 2405, and 2605 according to an exemplary embodiment may be omitted. In this case, operation 2401 according to an exemplary embodiment may be performed.

That is, operation 2401 according to an exemplary embodiment and operations 2403, 2603, 2405, and 2605 according to an exemplary embodiment may be optional.

In operations 2407, 2507, and 2607 according to an exemplary embodiment, the TP may transmit at least one PRS based on a PRS resource, and the UE may receive the at least one PRS.

In operations 2409, 2509, and 2609 according to an exemplary embodiment, the UE may transmit information requesting a zero-power and/or muting configuration for at least a part of the at least one PRS, and the TP may receive the information.

In operation 2411 according to an exemplary embodiment, the TP may transmit the at least one PRS at least partially configured with zero power and/or muting in response to the information requesting the zero-power and/or muting configuration, and the UE may receive the at least one PRS.

According to various embodiments of the present disclosure, a method performed by a UE in a wireless communication system may include receiving information related to a PRS resource, and receiving at least one PRS based on the PRS resource. The at least one PRS may be received in a plurality of time periods, and each of the plurality of time periods may include REs to which the at least one PRS is mapped. The PRS mapped to a part of REs included in at least one of the plurality of time periods may be configured with zero power.

In an exemplary embodiment, the PRS mapped to REs except for the part of the REs included in the at least one time period may be configured with non-zero power.

In an exemplary embodiment, the information related to the PRS resource may include (i) first information indicating that the PRS received in the at least one time period is configured with zero power, and (ii) second information indicating that the PRS mapped to the part of the REs to which the at least one PRS included in the at least one time period is configured with zero power.

In an exemplary embodiment, the first information may include a first bitmap indicating at least one of the plurality of time periods in a bitmap form.

In an exemplary embodiment, the second information may include a second bitmap indicating the part of the REs to which the at least one PRS included in the at least one time period is mapped in the time domain or the frequency domain, in a bitmap form.

In an exemplary embodiment, the length of the first bitmap may be equal to the number of the plurality of time periods.

In an exemplary embodiment, the length of the second bitmap may be equal to (i) the number of REs to which the at least one PRS included in each of the at least one time period in the time domain, or (ii) the number of REs to which the at least one PRS included in each of the at least one time period in the frequency domain.

More specific operations of the UE and/or the TP and/or the location server according to the above-described various embodiments of the present disclosure may be described and performed based on the descriptions of clause 1 to clause 3.

Examples of the above-described proposed methods may also be included as one of various embodiments of the present disclosure, and thus may be considered to be some proposed methods. While the proposed methods may be independently implemented, some of the proposed methods may be combined (or merged). It may be regulated that information indicating whether to apply the proposed methods (or information about the rules of the proposed methods) is indicated by a signal (e.g., a physical-layer signal or a higher-layer signal) predefined for the UE by the BS.

4. Exemplary Configurations of Devices Implementing Various Embodiments of the Present Disclosure 4.1. Exemplary configurations of devices to which various embodiments of the present disclosure are applied FIG. 27 is a diagram illustrating devices that implement various embodiments of the present disclosure.

Figure 27:
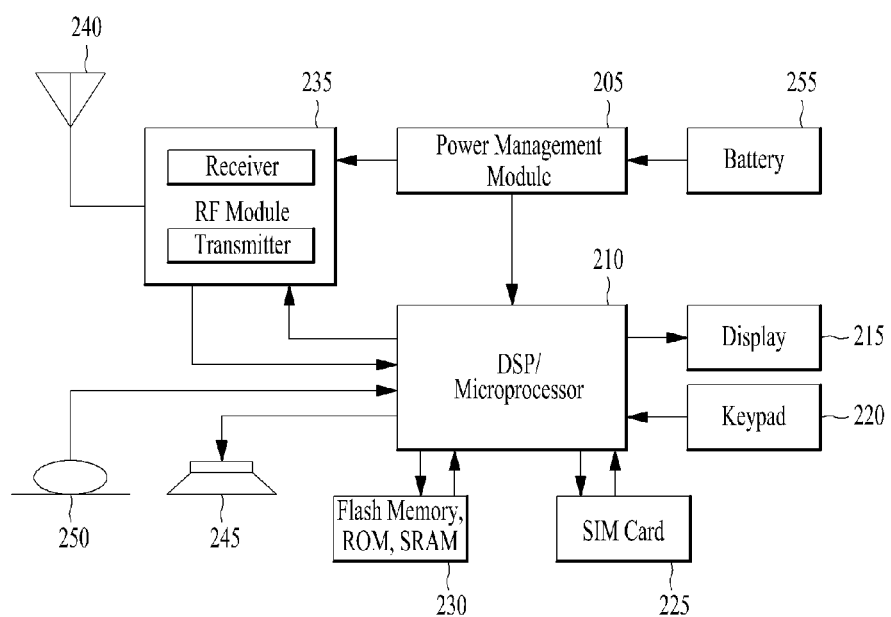
FIG. 27 is a diagram illustrating devices that implement various embodiments of the present disclosure.

The devices illustrated in FIG. 27 may be a UE and/or a BS (e.g., eNB or gNB) adapted to perform the afore-described mechanisms, or any devices performing the same operation.

Referring to FIG. 27, the device may include a digital signal processor (DSP)/microprocessor 210 and a radio frequency (RF) module (transceiver) 235. The DSP/microprocessor 210 is electrically coupled to the transceiver 235 and controls the transceiver 235. The device may further include a power management module 205, a battery 255, a display 215, a keypad 220, a SIM card 225, a memory device 230, an antenna 240, a speaker 245, and an input device 250, depending on a designer's selection.

Particularly, FIG. 27 may illustrate a UE including a receiver 235 configured to receive a request message from a network and a transmitter 235 configured to transmit timing transmission/reception timing information to the network. These receiver and transmitter may form the transceiver 235. The UE may further include a processor 210 coupled to the transceiver 235.

Further, FIG. 27 may illustrate a network device including a transmitter 235 configured to transmit a request message to a UE and a receiver 235 configured to receive timing transmission/reception timing information from the UE. These transmitter and receiver may form the transceiver 235. The network may further include the processor 210 coupled to the transceiver 235. The processor 210 may calculate latency based on the transmission/reception timing information.

A processor included in a UE (or a communication device included in the UE) and a BE (or a communication device included in the BS) according to various embodiments of the present disclosure may operate as follows, while controlling a memory.

According to various embodiments of the present disclosure, a UE or a BS may include at least one transceiver, at least one memory, and at least one processor coupled to the at least one transceiver and the at least one memory. The at least one memory may store instructions causing the at least one processor to perform the following operations.

A communication device included in the UE or the BS may be configured to include the at least one processor and the at least one memory. The communication device may be configured to include the at least one transceiver, or may be configured not to include the at least one transceiver but to be connected to the at least one transceiver.

According to various embodiments of the present disclosure, at least one processor included in a UE (or at least one processor of a communication device included in the UE) may receive information related to a PRS resource.

According to various embodiments of the present disclosure, the at least one processor included in the UE may receive at least one PRS based on the PRS resource.

According to various embodiments of the present disclosure, information requesting a zero-power configuration for at least a part of the at least one PRS based on the at least one PRS resource may be transmitted.

According to various embodiments of the present disclosure, the at least one PRS at least partially configured with zero power may be received in response to the information requesting the zero-power configuration.

According to various embodiments of the present disclosure, at least one processor included in a BS (or at least one processor of a communication device included in the BS) may receive information related to a PRS resource.

According to various embodiments of the present disclosure, the at least one processor included in the BS may transmit at least one PRS based on the PRS resource.

According to various embodiments of the present disclosure, the at least one processor included in the BS may receive information requesting a zero-power configuration for at least a part of the at least one PRS based on the at least one PRS resource.

According to various embodiments of the present disclosure, the at least one processor included in the BS may transmit the at least one PRS at least partially configured with zero power in response to the information requesting the zero-power configuration.

More specific operations of the processor included in the UE and/or the BS and/or the location server according to the above-described various embodiments of the present disclosure may be described and performed based on the descriptions of clause 1 to clause 3.

Unless contradicting each other, various embodiments of the present disclosure may be implemented in combination. For example, (a processor or the like included in) a UE and/or a BS and/or a location server according to various embodiments of the present disclosure may implement the embodiments described in clause 1 to clause 3 in combination, unless contradicting each other.

4.2. Example of communication system to which various embodiments of the present disclosure are applied In the present specification, various embodiments of the present disclosure have been mainly described in relation to data transmission and reception between a BS and a UE in a wireless communication system. However, various embodiments of the present disclosure are not limited thereto. For example, various embodiments of the present disclosure may also relate to the following technical configurations.

The various descriptions, functions, procedures, proposals, methods, and/or operational flowcharts of the various embodiments of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 28:
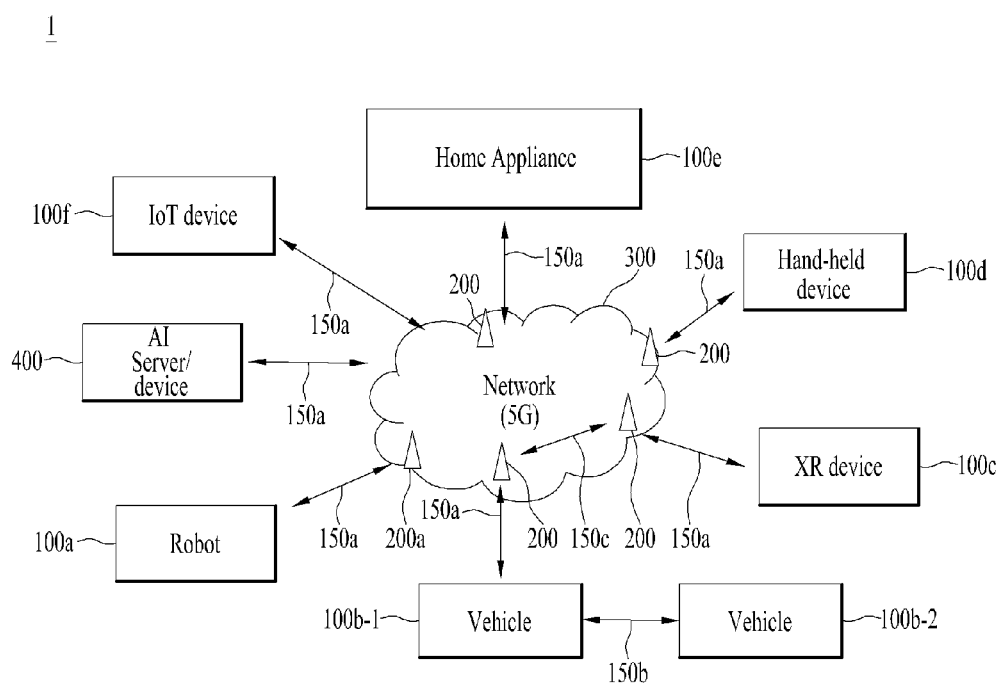
FIG. 28 illustrates an exemplary communication system to which various embodiments of the present disclosure are applied.

FIG. 28 illustrates an exemplary communication system to which various embodiments of the present disclosure are applied.

Referring to FIG. 28, a communication system 1 applied to the various embodiments of the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the various embodiments of the present disclosure.

Figure 29:
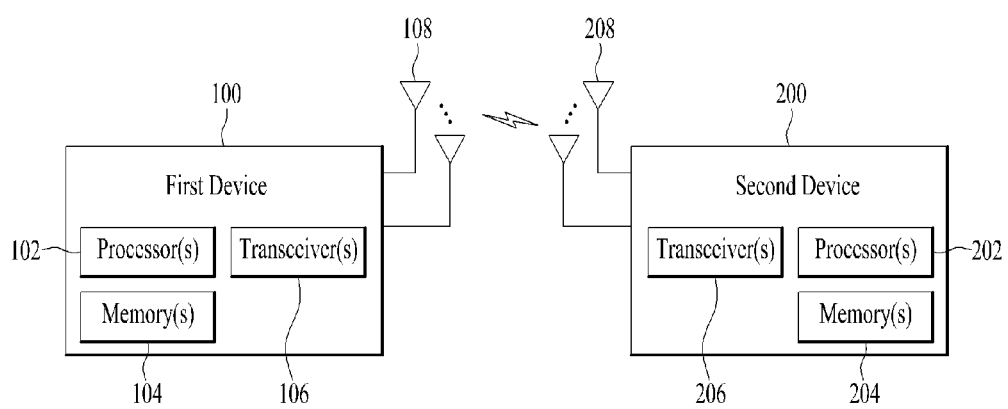
FIG. 29 illustrates exemplary wireless devices to which various embodiments of the present disclosure are applicable.

4.2.1 Example of Wireless Devices to which Various Embodiments of the Present Disclosure are Applied FIG. 29 illustrates exemplary wireless devices to which various embodiments of the present disclosure are applicable.

Referring to FIG. 29, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. W1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the various embodiments of the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the various embodiments of the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

According to various embodiments of the present disclosure, one or more memories (e.g., 104 or 204) may store instructions or programs which, when executed, cause one or more processors operably coupled to the one or more memories to perform operations according to various embodiments or implementations of the present disclosure.

According to various embodiments of the present disclosure, a computer-readable storage medium may store one or more instructions or computer programs which, when executed by one or more processors, cause the one or more processors to perform operations according to various embodiments or implementations of the present disclosure.

According to various embodiments of the present disclosure, a processing device or apparatus may include one or more processors and one or more computer memories connected to the one or more processors. The one or more computer memories may store instructions or programs which, when executed, cause the one or more processors operably coupled to the one or more memories to perform operations according to various embodiments or implementations of the present disclosure.

Figure 30:
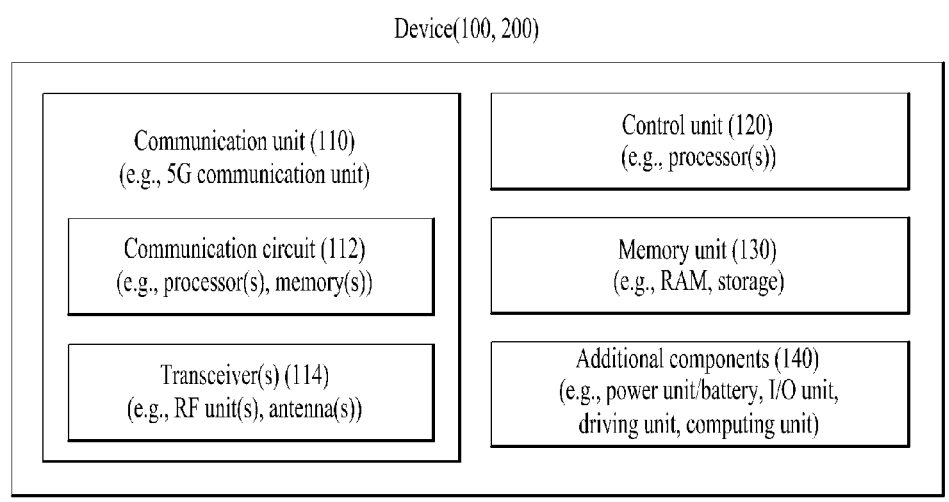
FIG. 30 illustrates other exemplary wireless devices to which various embodiments of the present disclosure are applied.

4.2.2. Example of Using Wireless Devices to which Various Embodiments of the Present Disclosure are Applied FIG. 30 illustrates other exemplary wireless devices to which various embodiments of the present disclosure are applied. The wireless devices may be implemented in various forms according to a use case/service (see FIG. 28).

Referring to FIG. 30, wireless devices 100 and 200 may correspond to the wireless devices 100 and 200 of FIG. 28 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 28. For example, the transceiver(s) 114 may include the one or more transceivers 106 and 206 and/or the one or more antennas 108 and 208 of FIG. 28. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. W1), the vehicles (100b-1 and 100b-2 of FIG. W1), the XR device (100c of FIG. W1), the hand-held device (100d of FIG. W1), the home appliance (100e of FIG. W1), the IoT device (100f of FIG. W1), a digital broadcast terminal, a hologram device, a public safety device, an MTC device, a medicine device, a fintech device (or a finance device), a security device, a climate/environment device, the AI server/device (400 of FIG. W1), the BS s (200 of FIG. W1), a network node, etc. The wireless device may be used in a mobile or fixed place according to a use-example/service.

In FIG. 30, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 30 will be described in detail with reference to the drawings.

Figure 31:
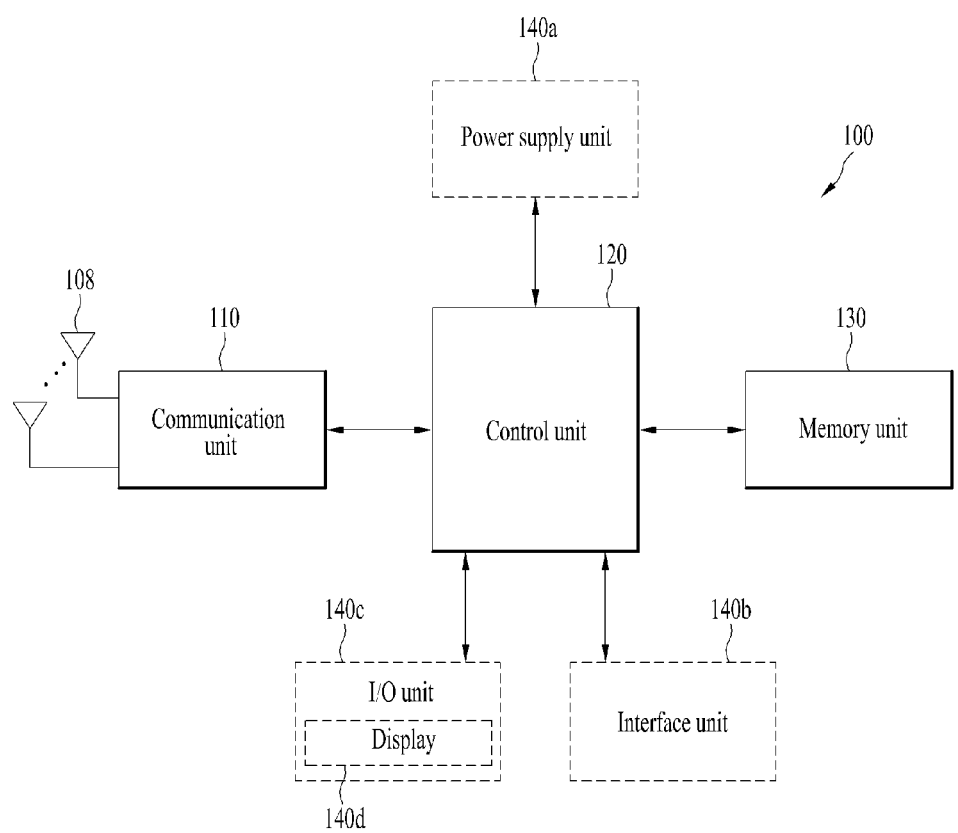
FIG. 31 illustrates an exemplary portable device to which various embodiments of the present disclosure are applied.

4.2.3. Example of Portable Device to which Various Embodiments of the Present Disclosure are Applied FIG. 31 illustrates an exemplary portable device to which various embodiments of the present disclosure are applied. The portable device may be any of a smartphone, a smartpad, a wearable device (e.g., a smartwatch or smart glasses), and a portable computer (e.g., a laptop). A portable device may also be referred to as mobile station (MS), user terminal (UT), mobile subscriber station (MSS), subscriber station (SS), advanced mobile station (AMS), or wireless terminal (WT).

Referring to FIG. 31, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. X3, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

4.2.4. Example of Vehicle or Autonomous Driving Vehicle to which Various Embodiments of the Present Disclosure.

Figure 32:
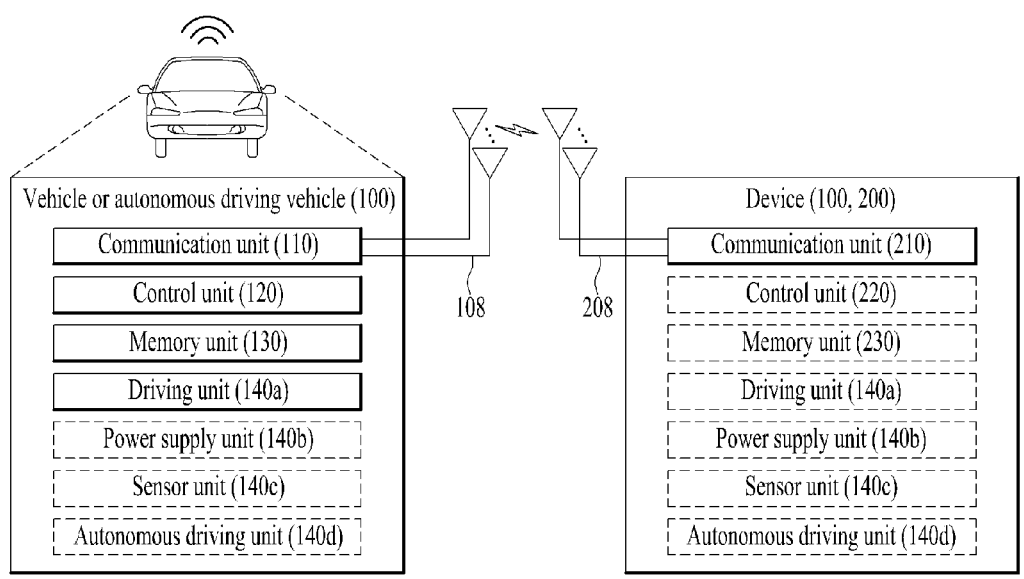
FIG. 32 illustrates an exemplary vehicle or autonomous driving vehicle to which various embodiments of the present disclosure.

FIG. 32 illustrates an exemplary vehicle or autonomous driving vehicle to which various embodiments of the present disclosure. The vehicle or autonomous driving vehicle may be implemented as a mobile robot, a car, a train, a manned/unmanned aerial vehicle (AV), a ship, or the like.

Referring to FIG. 32, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. X3, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 33:
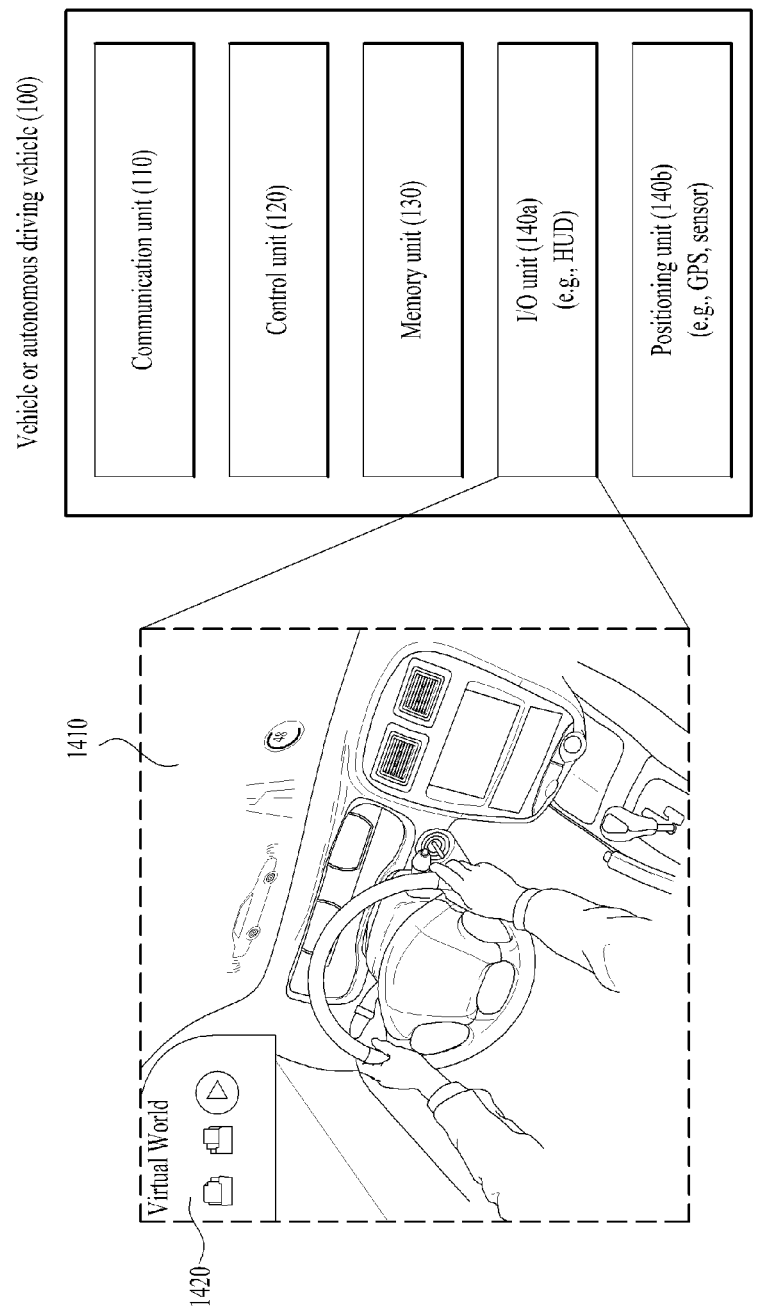
FIG. 33 illustrates an exemplary vehicle to which various embodiments of the present disclosure are applied.

4.2.5. Example of AR/VR and Vehicle to which Various Embodiments of the Present Disclosure FIG. 33 illustrates an exemplary vehicle to which various embodiments of the present disclosure are applied. The vehicle may be implemented as a transportation means, a train, an aircraft, a ship, or the like.

Referring to FIG. 33, a vehicle 100 may include a communication unit 110, a control unit 120, a memory unit 130, an I/O unit 140a, and a positioning unit 140b. Herein, the blocks 110 to 130/140a and 140b correspond to blocks 110 to 130/140 of FIG. 30.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140a may output an AR/VR object based on information within the memory unit 130. The I/O unit 140a may include an HUD. The positioning unit 140b may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140b may include a GPS and various sensors.

As an example, the communication unit 110 of the vehicle 100 may receive map information and traffic information from an external server and store the received information in the memory unit 130. The positioning unit 140b may obtain the vehicle position information through the GPS and various sensors and store the obtained information in the memory unit 130. The control unit 120 may generate a virtual object based on the map information, traffic information, and vehicle position information and the I/O unit 140a may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140a. In addition, the control unit 120 may broadcast a warning message regarding driving abnormity to neighboring vehicles through the communication unit 110. According to situation, the control unit 120 may transmit the vehicle position information and the information about driving/vehicle abnormality to related organizations.

In summary, various embodiments of the present disclosure may be implemented through a certain device and/or UE.

For example, the certain device may be any of a BS, a network node, a transmitting UE, a receiving UE, a wireless device, a wireless communication device, a vehicle, a vehicle equipped with an autonomous driving function, an unmanned aerial vehicle (UAV), an artificial intelligence (AI) module, a robot, an augmented reality (AR) device, a virtual reality (VR) device, and other devices.

For example, a UE may be any of a personal digital assistant (PDA), a cellular phone, a personal communication service (PCS) phone, a global system for mobile (GSM) phone, a wideband CDMA (WCDMA) phone, a mobile broadband system (MBS) phone, a smartphone, and a multi mode-multi band (MM-MB) terminal.

A smartphone refers to a terminal taking the advantages of both a mobile communication terminal and a PDA, which is achieved by integrating a data communication function being the function of a PDA, such as scheduling, fax transmission and reception, and Internet connection in a mobile communication terminal. Further, an MM-MB terminal refers to a terminal which has a built-in multi-modem chip and thus is operable in all of a portable Internet system and other mobile communication system (e.g., CDMA 2000, WCDMA, and so on).

Alternatively, the UE may be any of a laptop PC, a hand-held PC, a tablet PC, an ultrabook, a slate PC, a digital broadcasting terminal, a portable multimedia player (PMP), a navigator, and a wearable device such as a smartwatch, smart glasses, and a head mounted display (HMD). For example, a UAV may be an unmanned aerial vehicle that flies under the control of a wireless control signal. For example, an HMD may be a display device worn around the head. For example, the HMD may be used to implement AR or VR.

Various embodiments of the present disclosure may be implemented in various means. For example, various embodiments of the present disclosure may be implemented in hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the various embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the various embodiments of the present disclosure may be carried out in other specific ways than those set forth herein without departing from the spirit and essential characteristics of the various embodiments of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The various embodiments of present disclosure are applicable to various wireless access systems. Examples of the various wireless access systems include a 3GPP system or a 3GPP2 system. Besides these wireless access systems, the various embodiments of the present disclosure are applicable to all technical fields in which the wireless access systems find their applications. Moreover, the proposed methods are also applicable to an mmWave communication system using an ultra-high frequency band.

The invention claimed is:

1. A method performed by a user equipment (UE) in a wireless communication system, the method comprising:
receiving information on a resource for a reference signal (RS) related to positioning of the UE;
receiving at least one first RS related to positioning of the UE based on the resource;
transmitting information requesting a zero-power configuration for at least a part of the at least one first RS; and
receiving at least one second RS related to positioning of the UE, wherein the at least one second RS is at least partially configured with zero power based on the information requesting the zero-power configuration,
wherein, in a same time period, the at least one second RS is configured with zero power in a first part of a frequency resource among the resource and is not configured with zero power in a second part of the frequency resource.

2. The method according to claim 1,
wherein each of the at least one first RS is received from each of at least one transmission point (TP), and
wherein the information requesting the zero-power configuration comprises information requesting a zero-power configuration for a RS received from at least a part of the at least one TP.

3. The method according to claim 2, wherein a signal strength of the RS received from the at least part of the at least one TP is greater than signal strengths of RSs received from the at least one TP except for the at least part of the at least one TP.

4. The method according to claim 1,
wherein each of the at least one first RS is received based on (i) at least one resource and (ii) at least one resource set comprising the at least one resource,
wherein the information requesting the zero-power configuration comprises at least one of (i) information request a zero-power configuration for at least a part of the at least one resource or (ii) information requesting a zero-power configuration for at least a part of the at least one resource set, and
wherein each of the at least one resource is identified based on at least one of a resource identifier (ID) or a scrambling ID.

5. The method according to claim 1, further comprising receiving information indicating that at least a part of the at least one second RS is configured with zero power,
   wherein the information on the resource is received from a location management function (LMF) or a location server,
   wherein the information requesting the zero-power configuration is transmitted to a transmission point (TP) transmitting the at least one first RS, and
   wherein the information indicating that the at least part of the at least one second RS is configured with zero power is received from the TP by radio resource control (RRC) signaling, medium access control-control element (MAC-CE) signaling, or downlink control information (DCI).

6. The method according to claim 5,
   wherein the information indicating that the at least part of the at least one second RS is configured with zero power comprises information indicating that the at least part of the at least one second RS is configured with zero power for a first time period,
   wherein the information on the resource comprises information indicating the at least a part of the at least one second RS is configured with zero power for a second time period, and
   wherein the first time period is shorter than the second time period.

7. The method according to claim 1,
   wherein the at least one first RS is received in a plurality of time periods,
   wherein each of the plurality of time periods comprises resource elements (REs) to which the at least one first RS is mapped, and
   wherein a RS related to positioning of the UE is mapped to a part of REs included in at least one of the plurality of time periods and configured with zero power.

8. An apparatus operating in a wireless communication system, the apparatus comprising:
   a memory; and
   at least one processor coupled to the memory,
   wherein the at least one processor is configured to:
   receive information on a resource for a reference signal (RS) related to positioning of the apparatus;
   receive at least one first RS related to positioning of the apparatus based on the resource;
   transmit information requesting a zero-power configuration for at least a part of the at least one first RS; and
   receive at least one second RS related to positioning of the apparatus, wherein the at least one second RS is at least partially configured with zero power based on the information requesting the zero-power configuration,
   wherein, in a same time period, the at least one second RS is configured with zero power in a first part of a frequency resource among the resource and is not configured with zero power in a second part of the frequency resource.

9. The apparatus according to claim 8,
   wherein each of the at least one first RS is received from each of at least one transmission point (TP), and
   wherein the information requesting the zero-power configuration comprises information requesting a zero-power configuration for a RS received from at least a part of the at least one TP.

10. The apparatus according to claim 8,
    wherein each of the at least one first RS is received based on (i) at least one resource and (ii) at least one resource set comprising the at least one resource,
    wherein the information requesting the zero-power configuration comprises at least one of (i) information request a zero-power configuration for at least a part of the at least one resource or (ii) information requesting a zero-power configuration for at least a part of the at least one resource set, and
    wherein each of the at least one resource is identified based on at least one of a resource identifier (ID) or a scrambling ID.

11. The apparatus according to claim 8, wherein the apparatus communicates with at least one of a mobile terminal, a network, or an autonomous driving vehicle other than a vehicle comprising the apparatus.

12. A method performed by a base station (BS) in a wireless communication system, the method comprising:
    receiving information on a resource for a reference signal (RS) related to positioning of a user equipment (UE);
    transmitting at least one first RS related to positioning of the UE based on the resource;
    receiving information requesting a zero-power configuration for at least a part of the at least one first RS; and
    transmitting at least one second RS related to positioning of the UE, wherein the at least one second RS is at least partially configured with zero power based on the information requesting the zero-power configuration,
    wherein, in a same time period, the at least one second RS is configured with zero power in a first part of a frequency resource among the resource and is not configured with zero power in a second part of the frequency resource.

13. An apparatus operating in a wireless communication system, the apparatus comprising:
    a memory; and
    at least one processor coupled to the memory,
    wherein the at least one processor is configured to:
    receive information on a resource for a reference signal (RS) related to positioning of a user equipment (UE);
    transmit at least one first RS related to positioning of the UE based on the resource;
    receive information requesting a zero-power configuration for at least a part of the at least one first RS; and
    transmit at least one second RS related to positioning of the UE, wherein the at least one second RS is at least partially configured with zero power based on the information requesting the zero-power configuration,
    wherein, in a same time period, the at least one second RS is configured with zero power in a first part of a frequency resource among the resource and is not configured with zero power in a second part of the frequency resource.

14. An apparatus operating in a wireless communication system, the apparatus comprising:
    at least one processor; and
    at least one memory storing at least one instruction causing the at least one processor to perform a method,
    wherein the method comprises:
    receiving information on a resource for a reference signal (RS) related to positioning of the apparatus;
    receiving at least one first RS related to positioning of the apparatus based on the resource;
    transmitting information requesting a zero-power configuration for at least a part of the at least one first RS; and
    receiving at least one second RS related to positioning of the apparatus, wherein the at least one second RS is at least partially configured with zero power based on the information requesting the zero-power configuration, wherein, in a same time period, the at least one second RS is configured with zero power in a first part of a frequency resource among the resource and is not configured with zero power in a second part of the frequency resource.

15. A non-transitory computer-readable storage medium storing at least one instruction causing at least one processor to perform a method, wherein the method comprises:

receiving information on a resource for a reference signal (RS) related to positioning of a user equipment (UE);

receiving at least one first RS related to positioning of the UE based on the resource;

transmitting information requesting a zero-power configuration for at least a part of the at least one first RS; and receiving at least one second RS related to positioning of the UE, wherein the at least one second RS is at least partially configured with zero power based on the information requesting the zero-power configuration, wherein, in a same time period, the at least one second RS is configured with zero power in a first part of a frequency resource among the resource and is not configured with zero power in a second part of the frequency resource.

* * * * *